(12) United States Patent
Cheramie

(10) Patent No.: US 7,472,501 B2
(45) Date of Patent: Jan. 6, 2009

(54) METHOD AND SYSTEM FOR BUILDING UP LAND IN A WATER-COVERED OR WATER-SURROUNDED AREA AND LAND BODY FORMED BY USE OF SAME

(76) Inventor: Rickey Cheramie, P.O. Box 141, Golden Meadow, LA (US) 70357

( * ) Notice: Subject to any disclaimer, the term of this patent is extended or adjusted under 35 U.S.C. 154(b) by 254 days.

(21) Appl. No.: 11/192,975

(22) Filed: Jul. 29, 2005

(65) Prior Publication Data

US 2007/0068859 A1   Mar. 29, 2007

Related U.S. Application Data

(63) Continuation-in-part of application No. 10/695,640, filed on Oct. 28, 2003, now Pat. No. 6,922,922, which is a continuation-in-part of application No. 10/349,599, filed on Jan. 23, 2003, now Pat. No. 6,827,525.

(51) Int. Cl.
E02B 15/04 (2006.01)
E02D 17/16 (2006.01)
E02F 1/00 (2006.01)
E02F 3/00 (2006.01)

(52) U.S. Cl. .............................. 37/307; 405/63; 405/70; 405/74; 405/210

(58) Field of Classification Search .................. 405/60, 405/63, 70, 71, 73, 74, 222, 223, 210; 37/307–309, 37/312, 317–333, 342–344
See application file for complete search history.

(56) References Cited

U.S. PATENT DOCUMENTS

| | | | | |
|---|---|---|---|---|
| 3,418,961 A | * | 12/1968 | Browne | 440/12.64 |
| 3,842,785 A | * | 10/1974 | Rivet | 440/12.64 |
| 3,951,093 A | * | 4/1976 | Poche | 440/12.63 |
| 3,998,060 A | * | 12/1976 | Preus | 405/70 |
| 4,052,801 A | * | 10/1977 | Smith | 37/329 |
| 4,312,762 A | * | 1/1982 | Blackburn et al. | 210/768 |
| 4,664,792 A | * | 5/1987 | Fors et al. | 405/52 |
| 5,102,261 A | * | 4/1992 | Gunderson, III | 405/70 |
| 5,346,329 A | * | 9/1994 | Goans et al. | 405/68 |
| 5,511,508 A | * | 4/1996 | Wilson et al. | 114/356 |
| 5,893,978 A | * | 4/1999 | Yoda et al. | 210/747 |
| 5,901,475 A | * | 5/1999 | Wilson et al. | 37/195 |
| 5,960,890 A | * | 10/1999 | Crain | 172/166 |
| 5,984,032 A | * | 11/1999 | Gremillion et al. | 180/14.1 |

(Continued)

Primary Examiner—Christopher J. Novosad
(74) Attorney, Agent, or Firm—Schnader Harrison Segal & Lewis LLP

(57) ABSTRACT

An article of manufacture produced by a process comprising the steps of: erecting a sediment-containment structure comprising a plurality of floating boom segments; and introducing sediment into the shape formed by the sediment-containment structure. A system for building up sediment in a water-covered area comprises: a plurality of floating boom segments connected in an essentially closed shape; a sediment source depositing sediment inside the area substantially enclosed by the essentially closed shape formed by the boom segments; and a wasteweir segment disposed so as to close the essentially closed shape formed by the floating boom segments. The wasteweir segment has two posts and a removable barrier element. A method for building up land in a water-covered or water-surrounded area comprises the steps of: erecting a sediment-containment structure comprising a plurality of floating boom; and introducing sediment into the shape formed by the sediment-containment structure.

24 Claims, 30 Drawing Sheets

U.S. PATENT DOCUMENTS 6,119,375 A * 9/2000 Wilson et al. .................. 37/195
6,346,193 B1 * 2/2002 Bauer ......................... 210/615
6,485,229 B1 * 11/2002 Gunderson et al. ............ 405/63
6,567,341 B2 * 5/2003 Dreyer et al. .................. 367/1

* cited by examiner

END VIEW

METHOD AND SYSTEM FOR BUILDING UP LAND IN A WATER-COVERED OR WATER-SURROUNDED AREA AND LAND BODY FORMED BY USE OF SAME

CROSS-REFERENCE TO RELATED APPLICATIONS

This application is a continuation-in-part of applicant's U.S. patent application Ser. No. 10/695,640, filed Oct. 28, 2003, now U.S. Pat. No. 6,922,922 B2, which is a continuation-in-part of applicant's U.S. patent application Ser. No. 10/349,599, filed Jan. 23, 2003, now U.S. Pat. No. 6,827,525 B2. The disclosures of U.S. patent application Ser. No. 10/695,640, U.S. patent application Ser. No. 10/349,599, U.S. Pat. No. 6,922,922 B2, and U.S. Pat. No. 6,827,525 B2 are incorporated herein by reference.

STATEMENT REGARDING FEDERALLY SPONSORED RESEARCH OR DEVELOPMENT:

Not applicable.

REFERENCE TO SEQUENCE LISTING, TABLE, OR COMPUTER PROGRAM LISTING SUBMITTED ON COMPACT DISK:

Not applicable.

BACKGROUND OF THE INVENTION (1) Field of the Invention

The invention relates to the field of building up land in water-covered or water-surrounded areas and more specifically to the field of restoring land in coastal wetlands where erosion has caused land loss. This invention also relates to the field of building land bodies in water-covered or water-surrounded areas.

(2) Description of the Related Art

Coastal wetlands historically have been rich in plant and animal life. This abundance of plant and animal life has made coastal wetlands productive areas for fishing (for fish and shellfish), trapping, and hunting.

Coastal wetlands require a constant supply of sediment so that the process of sedimentation keeps pace with erosion. In a coastal wetland, the land is built up by sedimentation and broken down by erosion. In a stable coastal wetland, these processes are in balance when considered over the long term: land loss through erosion and land gain from sedimentation remain essentially equal. Seasonal or unusual events such as floods or storms may cause erosion and sedimentation to become unbalanced for a time. But in a stable wetland, erosion and sedimentation remain in balance over the long term.

Over at least the last 100 years, human activities have affected the natural balance between erosion and sedimentation in many coastal wetlands. Levees and other developments have reduced the flow of fresh water into many coastal wetlands. These developments have reduced the amount of sedimentation in the affected coastal wetlands by eliminating the sediment flows that were carried by the fresh water flow.

In addition to reducing sedimentation, the reduction of fresh water flow has also promoted erosion. The reduction of fresh water flow has changed the chemical composition—especially the salinity—of water in some coastal wetlands. Plants adapted to the previous (lower) salinity levels often die when salinity increases. Killing the plants increases erosion because many plants hold the land together and help to absorb impacts of waves and other water flows. When the plants die, erosion increases.

With erosion increasing and sedimentation decreasing, land area in coastal wetlands has shrunk. Facing the loss of a valuable resource, public officials and citizens have sought ways to reduce erosion and increase sedimentation in coastal wetlands so that lost land may be restored. Fresh water diversion from rivers into coastal wetlands merely keeps salt water at bay and does little to promote land restoration, not only because of decreased sediment in leveed rivers but also because diversion of fresh water typically uses siphons or pipes that place sediment-containing water into a single location rather than over a broader plain. Rivers currently contain seventy percent less sediment than they did fifty years ago because of flood-prevention methods upstream.

Applicant's U.S. patent application Ser. No. 10/695,640, now U.S. Pat. No. 6,922,922 B2, and U.S. patent application Ser. No. 10/349,599, now U.S. Pat. No. 6,827,525 B2, disclose devices, systems, and methods for restoring wetlands and building up land using a cutterhead dredge and other devices.

BRIEF SUMMARY OF THE INVENTION

It is an object of this invention to provide a method and system for building up land in a water-covered area. It is another object of this invention to provide a structure capable of confining sediment. It is another object of this invention to provide a structure capable of protecting land against impacts of waves and other water movement. To achieve these and other advantages and objects, and in accordance with the purpose of the invention as embodied and broadly described herein, in one aspect the inventor describes a system method for building up land in a water-covered area and a system and method for protecting land against impacts of waves and other water movement.

In a first embodiment, the method includes the steps of: supplying a floating structure having an essentially closed shape and capable of confining sediment; selecting a location in which land is to be built up; placing the floating structure at the location; and introducing a sediment-containing water flow into the interior of the essentially closed shape. In a second embodiment of the method, the steps remain substantially the same, but the floating structure is of a different configuration, with the floating structure comprising a pair of spaced and essentially parallel bodies defining the area in which sediment is to be confined.

Further in accordance with the purpose of the invention as embodied and broadly described herein, in another aspect, the inventor describes an embodiment of a system for building up land in a water-covered area. The system includes a plurality of floating boom segments, a wasteweir segment, and a sediment source. The boom segments and the wasteweir segment are connectable to form a shape that encloses an area wherein land is to be built up. The boom segments are connectable by connecting means as described further below. Each boom segment has a body that has a sieve panel attached thereto. Thus the assembled device includes an essentially closed shape formed by the boom segments and interrupted by the wasteweir segment. The assembled device also includes an essentially closed shape extending essentially between the water surface and the water bottom and interrupted by the wasteweir segment. The wasteweir segment enhances the rate of land formation by increasing the rate at which water from the sediment source may leave the enclosed area. Other embodiments of the invention may include multiple wasteweir segments or may omit wasteweir segments entirely. The wasteweir segment may be removed when the desired land body has been formed.

In the first embodiment of a system for building up land in a water-covered area, each boom segment has a floatable body having a first end portion, a second end portion, and a lower side portion; a first means for connecting the body attached to the first end portion and a second means for connecting the body attached to the second end portion; and a sieve panel attached to the lower side portion. The floating body is formed from buoyant material and may be formed in any convenient fashion allowing attachment of the sieve panel and the means for connecting the body. In the first embodiment, the floatable body is preferably made from a buoyant foam material. The foam material is preferably sealed within a skin of vinyl cloth. The skin is preferably equipped with grommeted holes for attaching means for connecting the body.

In the first embodiment, the sieve panel of each boom segment is preferably heat-bonded to the vinyl skin of the floatable body. The sieve panel of each boom segment has a generally rectangular shape and an upper portion, a lower portion, and first and second side portions, the first and second side portions of the sieve panel being respectively aligned with the first and second end portions of the body. Each first side portion of the sieve panel has disposed thereon a first means for connecting sieve panel; likewise, each second side portion of the sieve panel has disposed thereon second means for attaching sieve panel. In the first embodiment the means for connecting sieve panels are two connectible portions of a zipper. Other means, including ropes, cords, snaps, interlocking rigid connectors, and heat bonding, may also be used as sieve-panel connecting means. Each sieve panel has a height greater than or approximately equal to the depth of the water in the water-covered area and preferably has a height approximately twice the depth of the water in the water-covered area in order to create a terracing effect around the perimeter and to thereby mimic a naturally-sloped shoreline. Here the height of a sieve panel is the distance between its upper portion and its lower portion, measured with the sieve panel laid out upon a flat surface. When the sieve panel has a height greater than the depth of the water in which the sieve panel is used, the fact that the height of the sieve panel itself is greater than the water depth allows the sieve to bulge outward in a curved shape; for example, see FIG. 7.

In a preferred embodiment, the mesh of the sieve panel is approximately 1/16 inch. This allows for vegetation to take root and be anchored to the sieve panel. In some embodiments, the mesh of the sieve panel may be a biodegradable mesh material.

Optionally, each sieve panel has an anchor segment attached to and preferably running the length of its lower portion, the anchor segment being a segment of lead-core line, chain, or other similar dense, non-floating, generally linear material. The anchor segment helps to hold the lower portion of the sieve panel to the bottom of the water-covered area. Each boom segment has an anchor segment having a first end portion aligned with the first end portion of the floatable body and a second end portion aligned with the second end portion of the floatable body. Each anchor segment has first anchor connecting means disposed upon the first end portion thereof and second anchor connecting means disposed upon the second end portion thereof.

Optionally, each boom segment can also include a tiedown having a first end portion and a second end portion, the first end portion being attached to the body. The tiedown is secured so that its length under tension is approximately equal to the depth of the water and the length of the tiedown is at least approximately equal to the depth of the water. Preferably, the tiedown is fastened to the anchor line such that its length approximately equals the depth of the water. Tiedowns are intended to add strength to the boom segments and to keep the boom segments at the height of the wasteweir.

In the first embodiment the wasteweir segment is an essentially U-shaped frame having a height at least approximately equal to the depth of the water in the water-covered area. The frame is constructed so that it is denser than water. Aluminum, steel, or other appropriate materials can be used for the frame material. The wasteweir segment includes a first wasteweir-to-body connecting means allowing it to be connected to the second body-connecting means and a second wasteweir-to-body connecting means allowing it to be connected to the first body-connecting means. The wasteweir segment also includes means for connecting it to the first and second sieve-panel attaching means. The wasteweir segment also includes wasteweir-to-anchor connecting means disposed thereon to allow for connection to the anchor segments of boom segments adjacent to the wasteweir segment. By use of its various connecting means, the wasteweir segment may be inserted and connected as part of an assembly of boom segments. The wasteweir segment also includes barriers, which in the first embodiment are preferably ordinary wooden boards. The barriers are connectible to the wasteweir frame via barrier receiving means, which are grooves in the wasteweir frame as in the second embodiment.

The first embodiment also has a sediment source disposed so as to provide sediment flow into the interior of the closed shape formed by the boom segments and the wasteweir segment. The sediment source in the first embodiment is preferably the discharge of a dredge.

In an alternative embodiment, the wasteweir segment may comprise a pair of barrier-support posts, which are elongated elements of sufficient strength and stiffness to be driven into the water bottom in the water-covered area. The barrier-support posts are equipped with barrier receiving means, which may be grooves or any other suitable means for receiving barriers. See FIG. 16.

In an alternative embodiment, the sieve panel of each boom segment does not have an anchor line attached thereto. Instead, one or more non-floating objects may be attached to one or more boom segments. For example, a single anchor line of the desired length may be attached to the sieve panels, to the tiedowns of each segment, and to the wasteweir segment, thus running the length of the device. In the embodiments described above, the essentially closed shape may preferably be about 900 to 1000 feet in circumference; and the embodiment may preferably be employed in water with a depth less than about 4 feet, although the use of the embodiment is not limited to that depth.

In another embodiment, the device may comprise parallel sets of floatable bodies disposed opposite one another, with a wasteweir segment at each end of each set of floatable bodies. In this embodiment, the parallel sets of floatable bodies are attached to opposite edges of a shared sieve panel. Note that each floatable body may comprise multiple segments linked together as described elsewhere herein, although this discussion focuses on an embodiment in which each floatable body is a single item rather than a combination of shorter floatable bodies. The shared sieve panel is preferably heat-bonded to the vinyl skin of the floatable body and may be made from the same meshes that are discussed herein or in the material incorporated by reference. The shared sieve panel has a generally rectangular shape and an upper portion, a lower portion, and first and second side portions, the first and second side portions of the sieve panel being respectively aligned with the first and second end portions of the floatable bodies. Each first side portion of the sieve panel has disposed thereon a first means for connecting sieve panel; likewise, each second side portion of the sieve panel has disposed thereon second means for attaching sieve panel. The means for connecting sieve panels may be two connectible portions of a zipper. Other means, including ropes, cords, snaps, interlocking rigid connectors, and heat bonding, may also be used as sieve-panel connecting means. Each sieve panel preferably has a height greater than two times the depth of the water in the water-covered area and preferably has a height approximately equal to the sum of (a) twice the depth of the water in the water-covered area, plus (b) the dimension of the land to be built up, as measured perpendicular to the floatable bodies. Here the height of a sieve panel is the distance between its upper portion and its lower portion, measured with the sieve panel laid out upon a flat surface. This embodiment preferably has, at each end of the floatable boom segments, a wasteweir segment connectible to the boom segments and sieve panel by the same means described above. Preferably the result of assembling this embodiment is one or more roughly rectangular structures for containing sediment as shown in the drawing FIGS. 22 and 25. The shared sieve panel is suspended from the floatable bodies so that, when sediment is introduced into the interior of the structure, a portion the shared sieve panel can rest on the water bottom as shown in drawing FIG. 23. Note that the structure optionally may include transverse tension cords, ropes, or rigid members connecting the transverse bodies. Although this embodiment most advantageously has two wasteweir segments, embodiments substituting a boom segment of appropriate length for one or more of the wasteweir segments also may be used.

In alternative embodiments of the sediment-containment structures described herein, an optional support frame may be used. The support frame or ribbed skeleton is fixed to the sieve panel or shared sieve panel of a sediment-containment structure for the purpose of giving the structure additional stiffness and a defined shape. Embodiments of the support frame may be used in conjunction with the upper and lower portion of a sieve panel as shown in drawing FIGS. 26 and 27.

Optionally, a sediment-containment structure disclosed herein may use a secondary sieve panel and secondary boom to decrease loss of sediment over a floatable body of a sediment-containment structure. The secondary boom is a floatable body and may optionally be connectible in the same manner as segments of the sediment-containment boom described above. The sieve panel of the secondary boom is connected is any suitable manner (tying, fusing, stapling, adhesives, and other methods known or stated herein) to either a floatable body or a mesh portion of a sediment-containment structure. In use, the secondary boom is positioned outside the sediment-containment structure. As the sediment-containment structure fills, the secondary boom provides secondary containment for sediment spilling over the floatable body of a sediment-containment structure. FIG. 28 an embodiment of such a device.

Further optionally, a sediment-containment structure may comprise one and preferably a plurality of stakes inserted into the water bottom outside the sediment-containment structure. These stakes may take the form of PVC or other pipes or any other body suitably stiff and strong for the application. Each stake is connected to a stake rope, which is connected to a stake-rope-to-mesh connector, which may take the form of a plastic clip attachable or attached to the mesh of a sieve panel or shared sieve panel. The stake-rope-to-mesh connector may include rings, apertures, cleats or other structures around which a cord or rope may be fastened. Where stakes and stake ropes are used, the height of a sieve panel may be selected to be substantially greater than the depth of the water, because the stake can hold the sieve panel under tension, there is less risk of fouling of the device. Also, the stakes may provide more precise control of the location and shape of the land mass formed using the structure. In this application, a land mass includes land built up above the water level in a water covered area and also includes a buildup of sediment on a water bottom decreasing the depth of water in that area. See FIG. 12 through 19. Note FIGS. 14 through 15 and 17 through 19; each set of figures shows a sequence in which sediment is added to an embodiment of the invention having stakes.

In another embodiment of the invention comprising stakes, the invention is used to provide a wave-bumper structure capable of protecting land against impacts of waves and other water movement. See drawing FIG. 29, which depicts an embodiment of such a device. The wave-bumper structure may use one or more boom segments as disclosed herein and additionally includes a ring attached to the anchor segment thereof so that a wave-bumper-stake, having the characteristics of a stake as described above, may be driven through the ring to fix the structure to a land mass to be protected from the action of waves or other moving water. The wave-bumper stake could also be attached to the anchor segment of a boom segment in any conventional manner, such as ties, staples, and other methods disclosed above.

Both the foregoing general description and the following detailed description are exemplary and explanatory only and do not restrict the invention as claimed.

BRIEF DESCRIPTION OF THE DRAWINGS

The invention will be better understood in view of the following description presented with reference to the accompanying drawings.

Both the foregoing general description and the following detailed description are exemplary and explanatory only and do not restrict the invention as claimed.

DETAILED DESCRIPTION OF THE INVENTION

Figure 6:
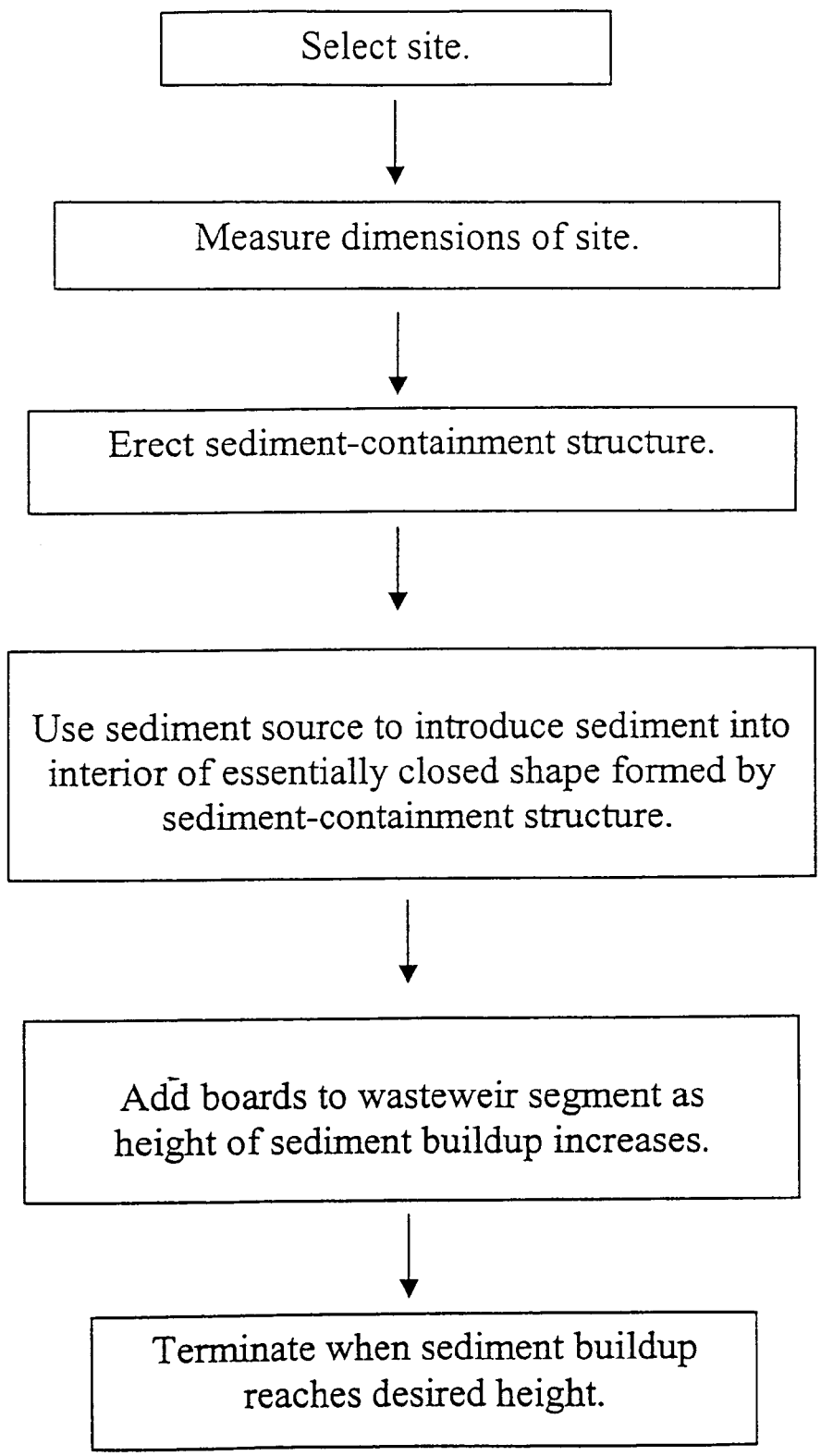
FIG. 6 is a flow chart showing the steps, the steps being those which one embodiment of the method of the invention comprises.
Figure 7:
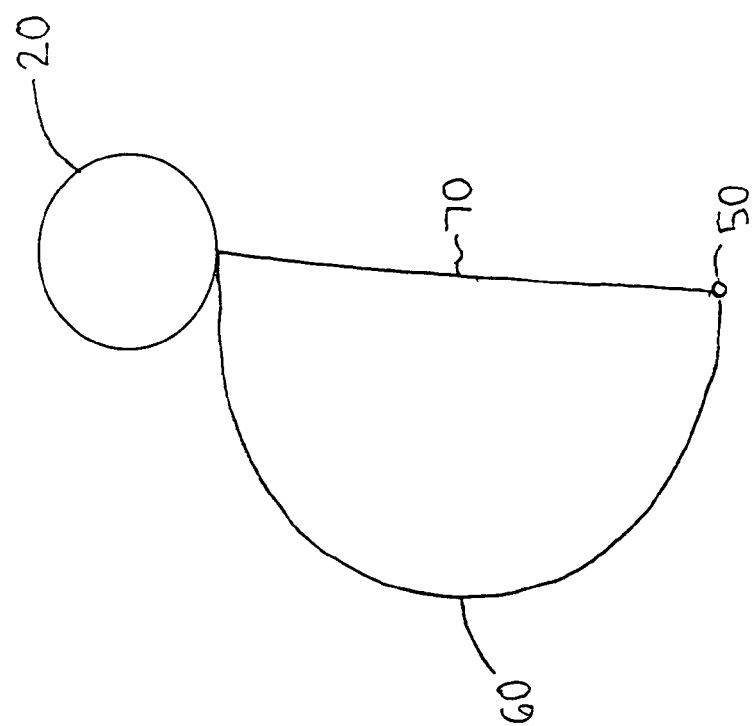
FIG. 7 is a sectional view of an embodiment of the invention shown in FIG. 2, taken along section D-D thereof.

The inventor now moves to a detailed description of an embodiment of the method of the invention, which is shown in the drawings, where like parts are labeled with like reference numerals. FIG. 6, is a flow chart depicting the steps that are involved in the embodiment depicted therein.

1. Select a site where the method will be practiced. The site is typically a coastal marsh or wetland that has been eroded through a process that includes salt-water intrusion. Islands that have been degraded due to erosion can also be selected.

2. Measure the dimensions of the site including the depth of the water contained at various locations around the site.

3. Erect a sediment-containment structure in the manner described below.

4. Introduce sediment into the substantially closed shape formed by the sediment-containment structure.

Additionally, board or other blocking means can be added to a wasteweir segment as the height of sediment buildup increases.

The inventor now moves to a detailed description of an embodiment of the system of the invention, which is shown in the drawings, where like parts are labeled with like reference numerals. In FIGS. 1 through 5, system 10 for building up land in a water-covered area includes boom segments 20, wasteweir segment 80, and dredge discharge 500, which discharges sediment-containing flow 520 inside the closed shape formed by the assembly of boom segments 20 and wasteweir segment 80.

Figure 1:
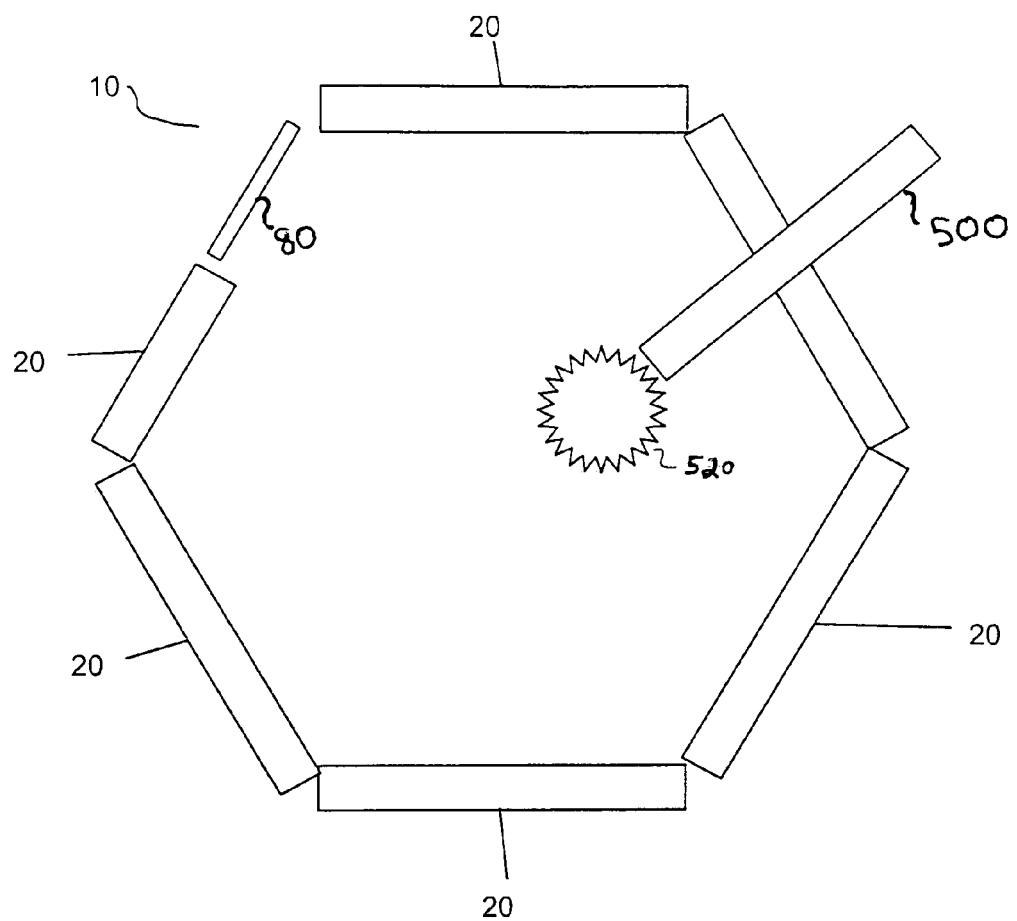
FIG. 1 is a top view showing an embodiment of the invention, including the assembled components thereof.
Figure 2:
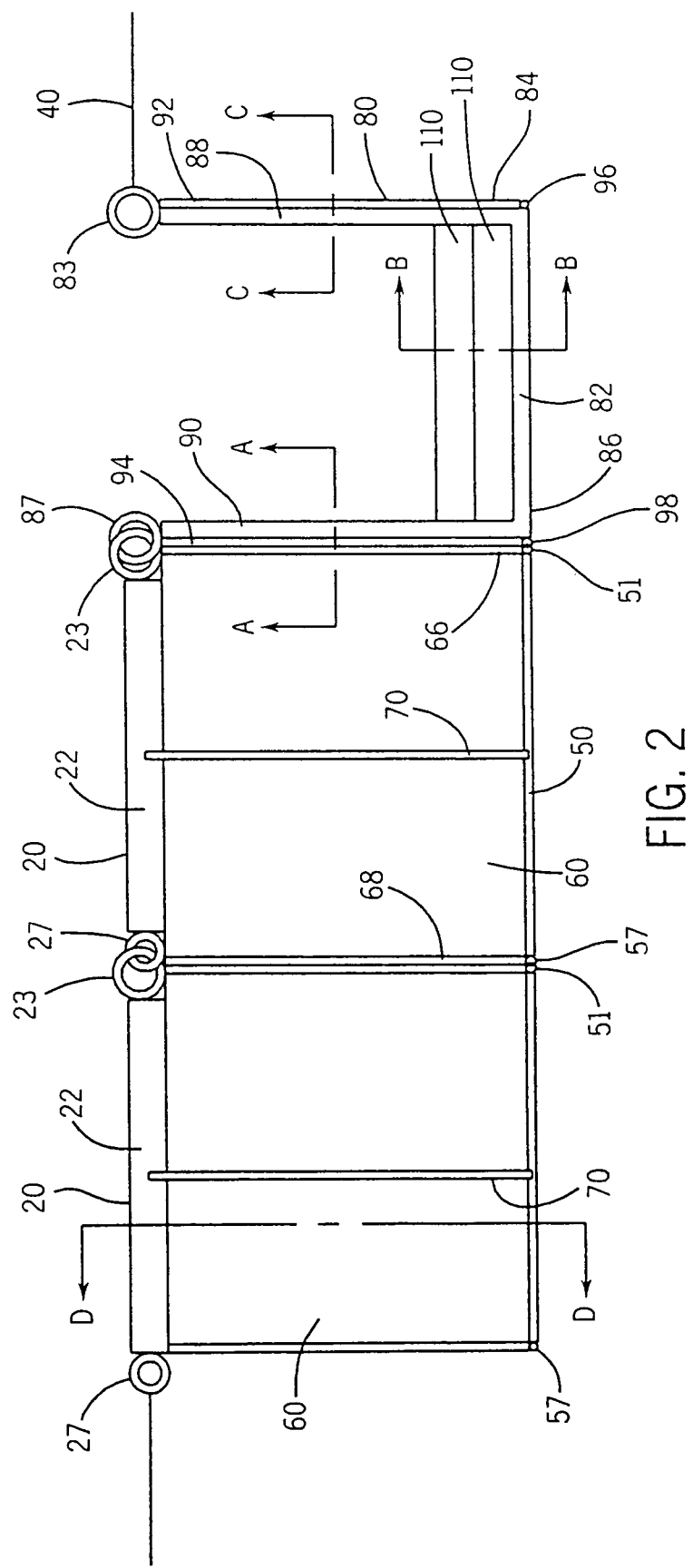
FIG. 2 is a partial side view of an embodiment of the invention.
Figure 4:
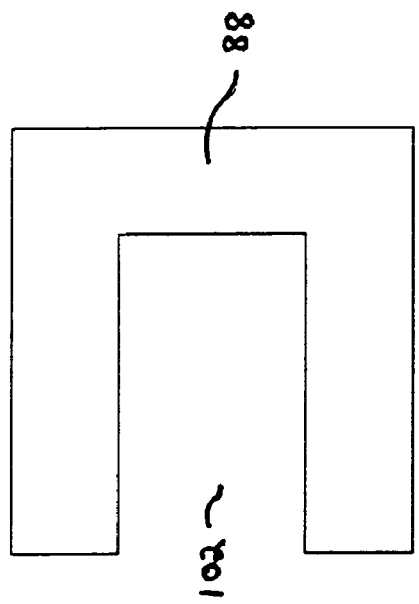
FIG. 4 is a view of the frame of the wasteweir segment depicted in FIG. 2, taken along section C-C of FIG. 2.
Figure 3:
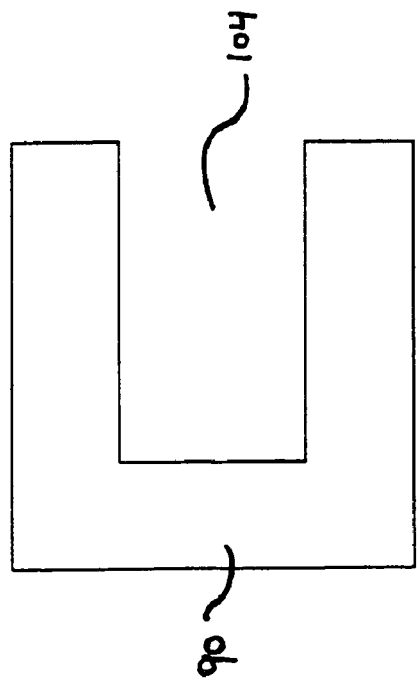
FIG. 3 is a view of the frame of the wasteweir segment depicted in FIG. 2, taken along section A-A of FIG. 2.
Figure 5:
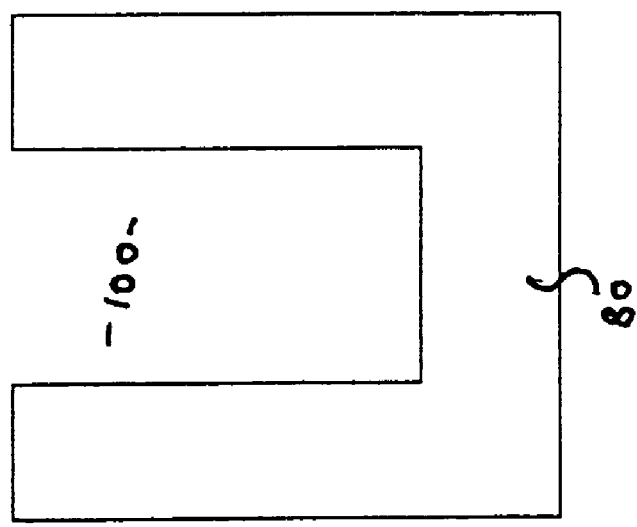
FIG. 5 is a view of the frame of the wasteweir segment depicted in FIG. 2, taken along section B-B of FIG. 2.

FIG. 2 is a partial side view of the system 10 in use, with floatable bodies 22 of boom segments 20 floating upon water surface 40. In this embodiment, each floatable body segment is preferably constructed from a buoyant foam material that has a waterproof vinyl skin. Each boom segment 20 has first body-connecting means 23, for connecting one boom segment to an adjacent boom segment, and second body-connecting means 27 for the same purpose. Means 23 and 27 are disposed on opposite end portions of a boom-segment 20. The first body-connecting means 23 is connectible to the second body-connecting means 27 for connecting adjacent segments 20. These body-connecting means are rings in the depicted embodiment, but they may be any suitable known connecting means including ropes, straps, rings, hooks, and interlocking rigid connectors. The connectors may be attached to the floating body by any convenient means, including fixation with adhesives, heat-bonding, or passing the connectors through grommeted perforations in the vinyl skin of the floating body.

In the embodiment depicted in the FIGS. 1 through 7 of the drawing, each boom segment 20 also has attached, to its lower side portion, sieve panel 60. Sieve panel 60 has an upper portion, a lower portion, and first and second side portions aligned with the first and second end portions 23 and 27, respectively, of body 22. Sieve panel 60 is made from a mesh or cloth having a weave sufficiently tight to trap a significant portion of the sediment carried by a water flow passing through the mesh and potentially sized so as to allow roots to attach or anchor to or through the sieve panel. Optionally, a biodegradable material may be selected. Sieve panel 60 has first means 66 for connecting sieve panel 60 disposed upon its first side portion and second means 68 for connecting sieve panel disposed upon its second side portion. Each sieve panel 60 is connected by its first means 66 for connecting sieve panel to an adjacent sieve panel 60 or to an adjacent wasteweir segment 80; each sieve panel 60 is connected by its second means 68 for connecting the sieve panel to an adjacent sieve panel 60 or to an adjacent wasteweir segment 80. The first means 66 and second means 68 for connecting sieve panels may be any suitable connecting device, including two compatible portions of a zipper; a row of eyelets for securing with cord or rope, or even the mesh itself, through which a securing cord, thread, staple, or other device may be looped, woven, or otherwise secured.

Each boom segment has anchor segment 50, which is attached to the lower portion of the sieve panel 60. Anchor segment 50 is made from a dense material (at least denser than water) such as lead-core line or heavy chain. Anchor segment 50 secures the device to the bottom of the water-covered area in order to prevent unwanted movement. Each anchor segment 50 has first anchor-connecting means 51 aligned with first body-connecting means 23 and second anchor-connecting means 57 aligned with second body-connecting means 27. These first and second anchor-connecting means may be any suitable known connecting means, including those listed for use as body-connecting means. Alternatively, a single, continuous anchor segment can be used to anchor all of the sieve panels.

Each boom segment 20 has tiedown 70 having first and second end portions. The first tiedown end portion is attached to body 22, and the second tiedown end portion is attached to anchor segment 50. Tiedown 70 has a length approximately equal to the depth of the water.

Wasteweir segment 80 is a three-sided frame having a base 82 having first end portion 84 and second end portion 86 and having first side element 88 and second side element 90 joined in substantially perpendicular relation to base 82. First side element 88 has first body-wasteweir connecting means 83 attached near the end thereof most remote from base 82; second side element 90 has second body-wasteweir connecting means 87 attached near the end thereof most remote from base 82.

First body-wasteweir connecting means 83 is a connector connectible to second body-connecting means 27. Second body-wasteweir connecting means 87 is a connector connectible to first body-connecting means 23. In addition, the first end portion of base 82 has attached thereto first wasteweir-anchor connecting means 96 and second wasteweir-anchor connecting means 98. First wasteweir-anchor connecting means 96 is connectible to second anchor-connecting means 57, and second wasteweir-anchor connecting means 98 is connectible to first anchor-connecting means 51.

Wasteweir first side 88 has attached thereto first wasteweir-sieve connecting means 92; second wasteweir side 90 has attached thereto second wasteweir-sieve connecting means 94. First wasteweir-sieve connecting means 92 is connectible to second sieve-panel connecting means 68. Second wasteweir-sieve connecting means 94 is connectible to first means sieve-panel connecting means 66.

The frame of wasteweir segment 80 includes longitudinal opening 100 in base 82, longitudinal opening 102 in first side 88, and longitudinal opening 104 in second side 90, each longitudinal opening being a groove adapted for receiving a board 110. These longitudinal openings constitute the barrier receiving means of this embodiment of the invention. Other barrier-receiving means would include pegs to which barriers may be affixed, magnets, rigid interlocking connectors, and holes with screws or bolts allowing the barriers to be screwed or bolted to the frame. Barriers 110 are preferably wooden boards fitted into the wasteweir segment as the level of built-up land rises in order to contain sediment while allowing for a rapid discharge of water from the water-covered area.

The inventor now moves to a detailed description of an embodiment of an amphibious dredging vehicle 700, which is an element of some embodiments of the invention.

Figure 9:
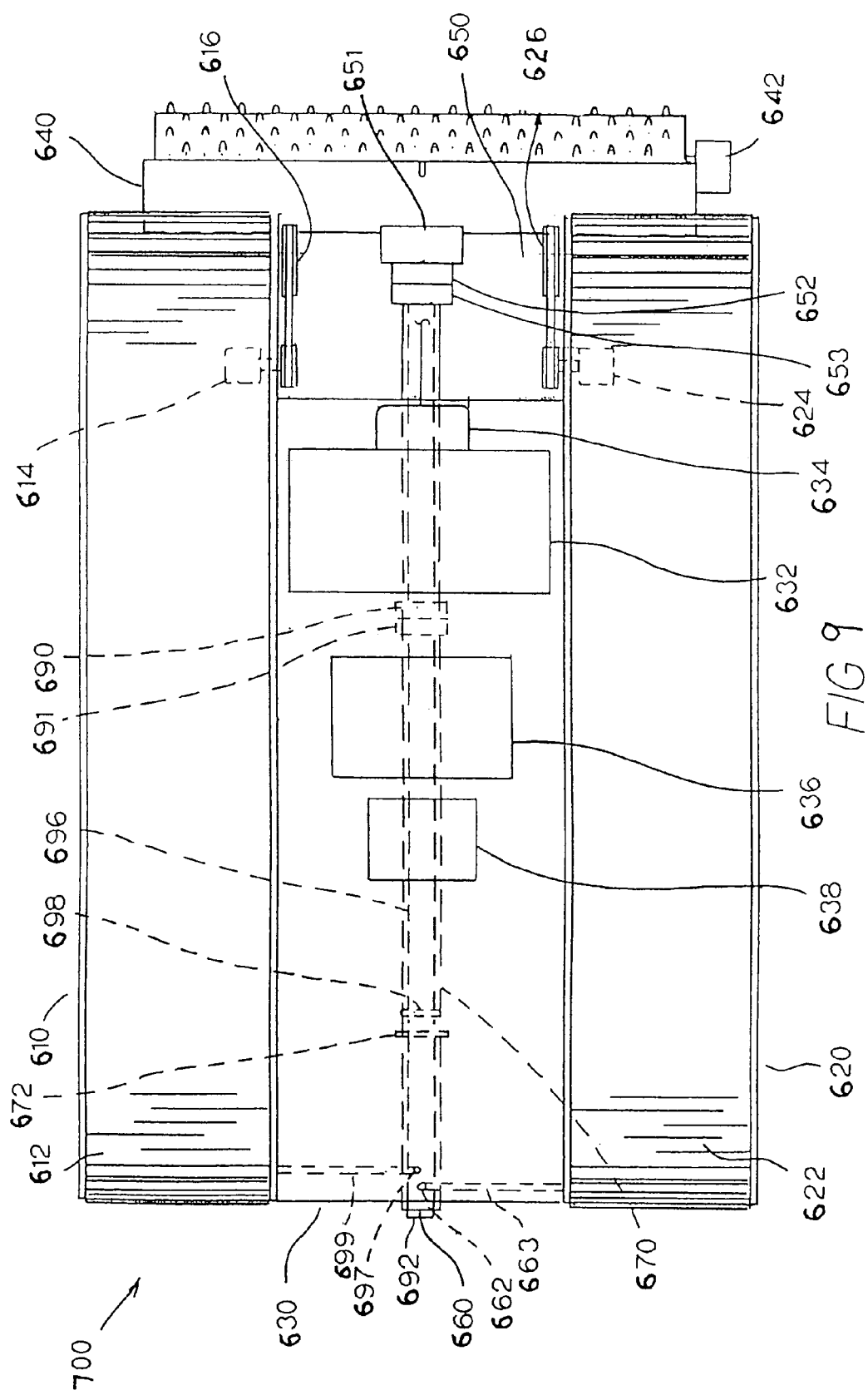
FIG. 9 is a partial top view of an amphibious dredging vehicle according to the invention.

As best seen in FIG. 9, amphibious dredging vehicle 700 has first floatable pontoon 610 and second floatable pontoon 620 with a link disposed therebetween and fixed thereto in conventional fashion, such as by welding or bolting the link to floatable pontoons 610 and 620. In this embodiment, floatable pontoons 610 and 620 are constructed of lightweight and sturdy metal and are equipped with conventional internal baffles, which increase the strength of the pontoons and render the pontoons less likely to lose their buoyancy due to a leak or puncture. The link between the floatable pontoons 610 and 620 may take any convenient and sufficiently sturdy form. In the embodiment depicted, the link takes the form of a conventional metal frame 631 having a generally flat deck 630 mounted thereon. The deck 630 allows for a convenient mounting point for other components of the invention and for other components of the amphibious dredging vehicle 700. The total width and length of the amphibious dredging vehicle 700 may preferably be selected to allow the amphibious dredging vehicle 700 to be transported by truck.

The front end portions of first floatable pontoon 610 and second floatable pontoon 620 are aligned with the front end portion of deck 630. First floatable pontoon 610 has conventional drive track 612 mounted thereon. Second floatable pontoon 620 has conventional drive track 622 mounted thereon. The pontoons may be constructed of any material that is sufficiently light and durable to allow construction of a sturdy and floatable pontoon; examples include aluminum and steel.

Mounted to the front end portion of the deck 630 is cutterhead 640. Cutterhead 640 may be of any convenient design, including cylindrical or disk-shaped rotating devices or arrays of high-pressure water jets; a cylindrical rotating design is shown here. Also mounted to the deck 630 is dredge pump 650, which is operatively connected to cutterhead 640 in conventional fashion. Dredge pump 650 includes both impeller housing 651 and ten-inch hydraulic pump 652.

Figure 11:
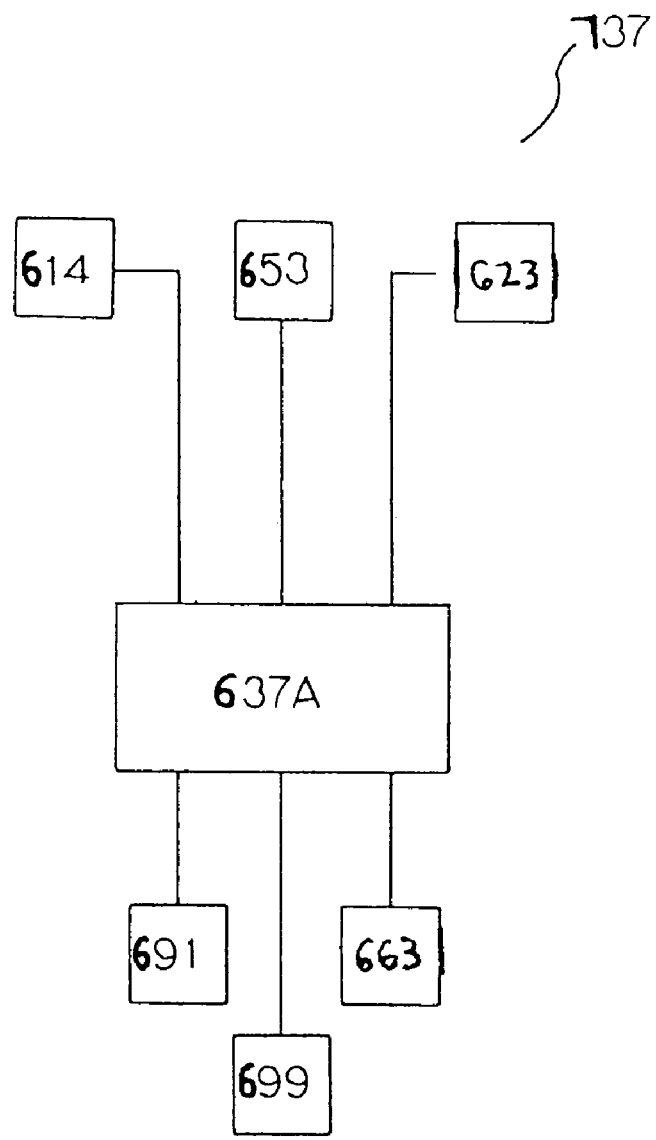
FIG. 11 is a schematic diagram showing a hydraulic circuit according to the invention.
Figure 12:
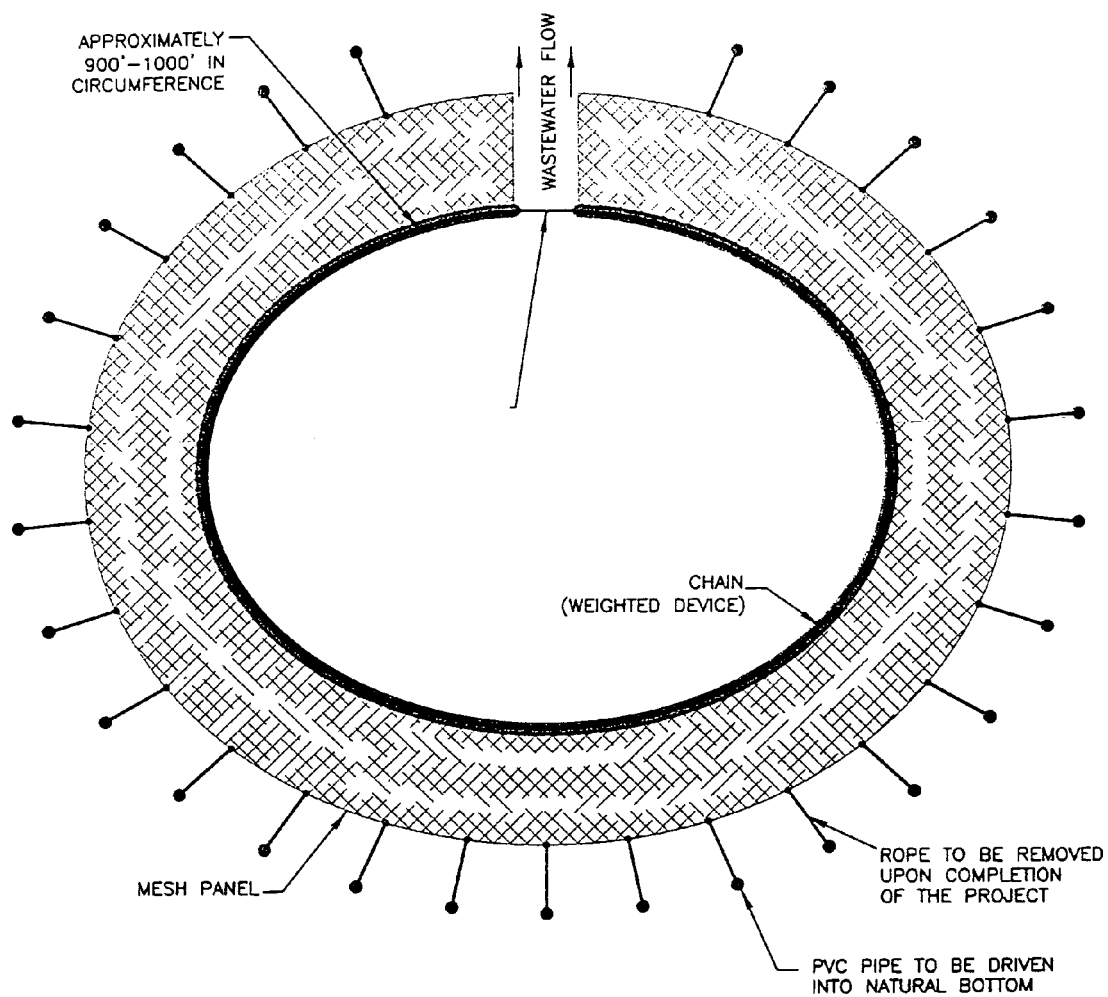
FIG. 12 is a top schematic diagram showing an embodiment of a sediment-containment structure according to the invention.
Figure 13:
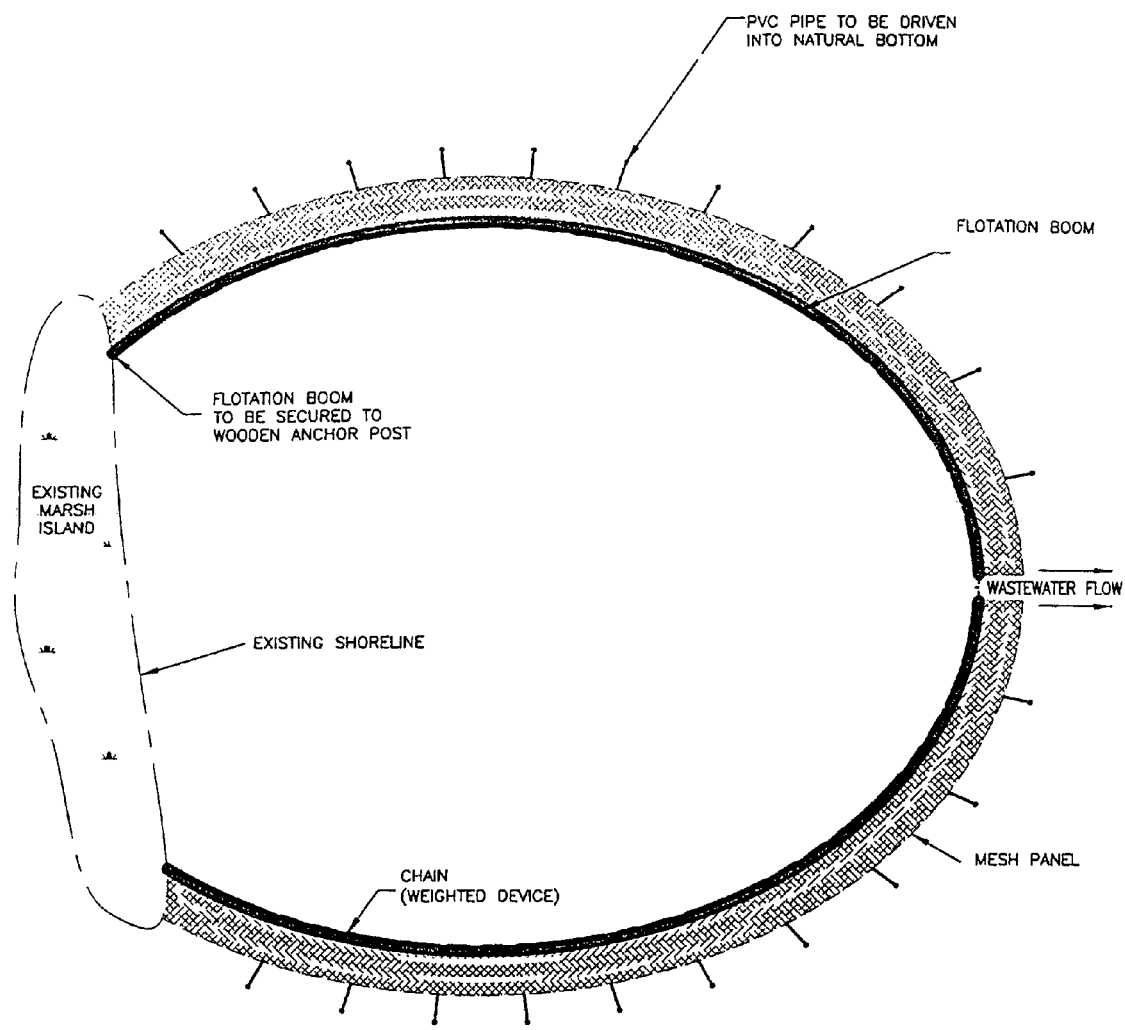
FIG. 13 is a top schematic diagram showing an alternative embodiment of a sediment-containment structure according to the invention.
Figure 14:
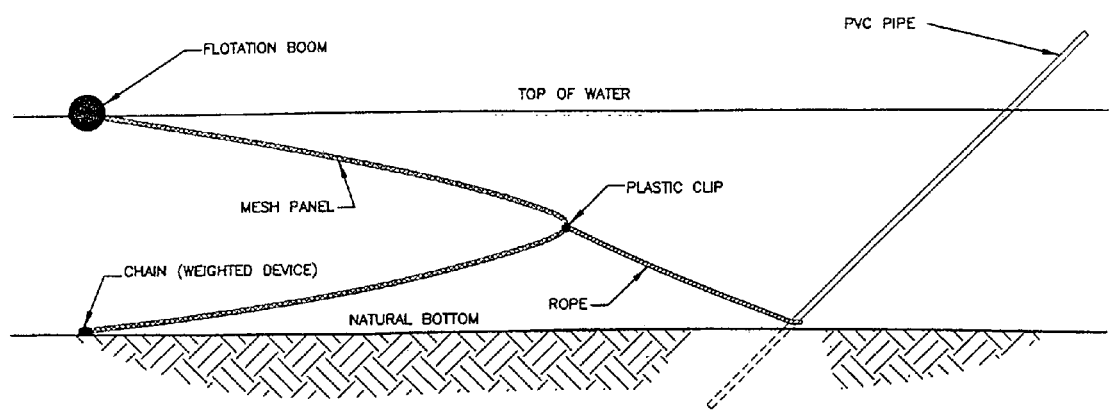
FIG. 14 is a sectional schematic diagram of the sediment-containment structure of the type shown in FIG. 12 and FIG. 13.
Figure 15:
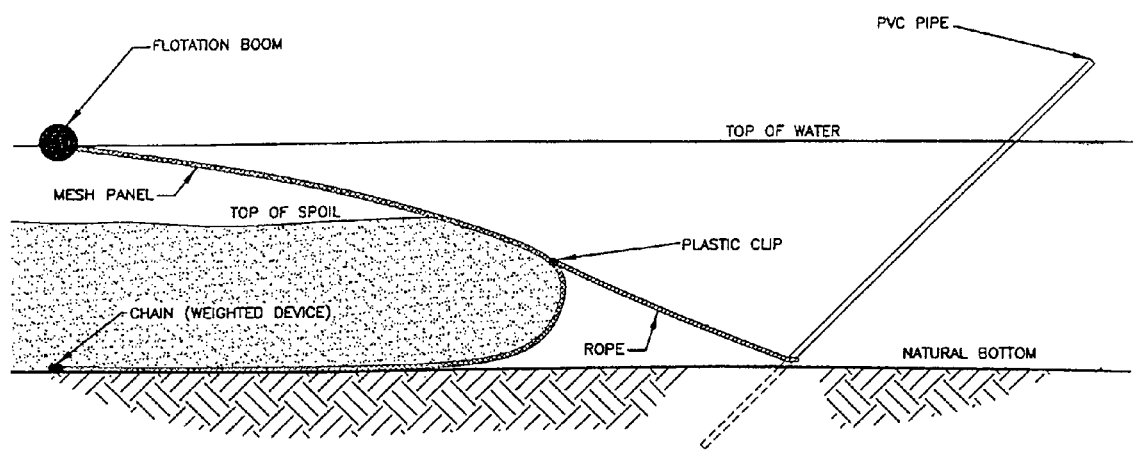
FIG. 15 is a sectional schematic diagram of a sediment-containment structure as in FIG. 14, but showing the structure after some sediment has been contained therein.
Figure 16:
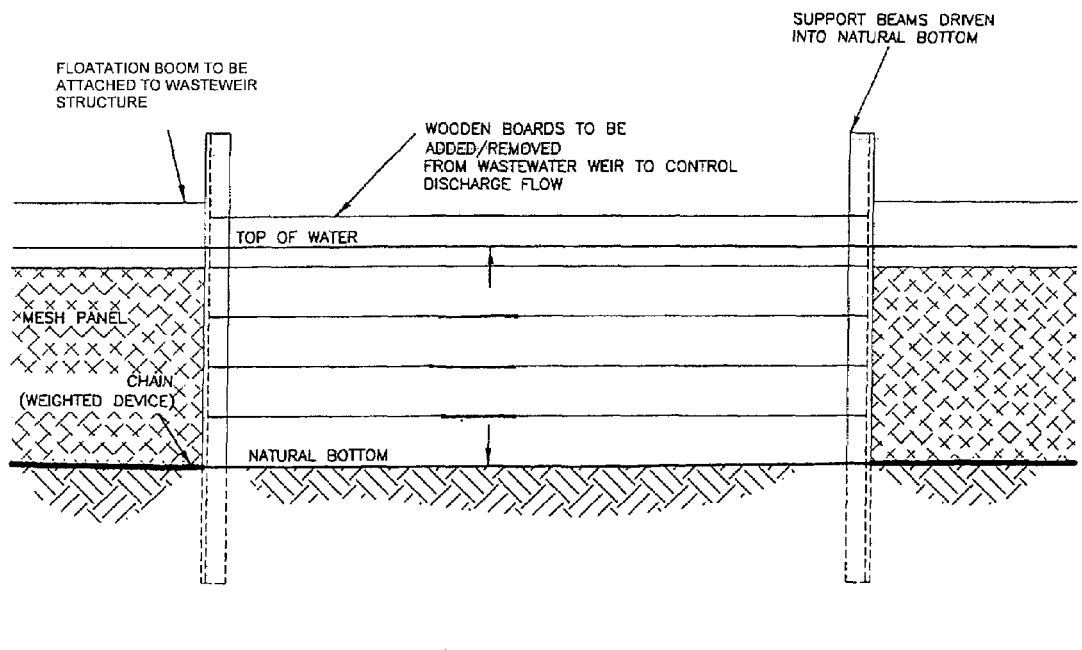
FIG. 16 is a partial side view of an embodiment of a sediment-containment structure according to the invention, showing an embodiment of a wasteweir segment.
Figure 17:
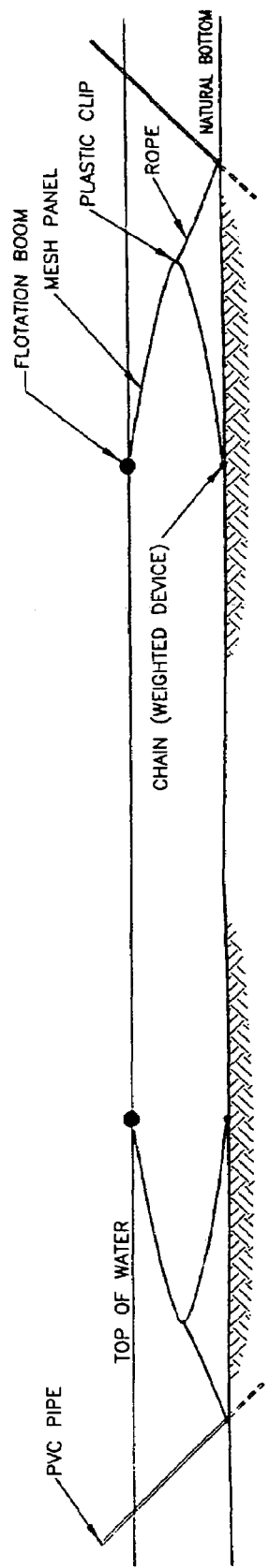
FIGS. 17 through 19 are sectional schematic diagrams of a sediment-containment structure and an article of manufacture according to the invention, showing the effect of the method of the invention in building up land.
Figure 18:
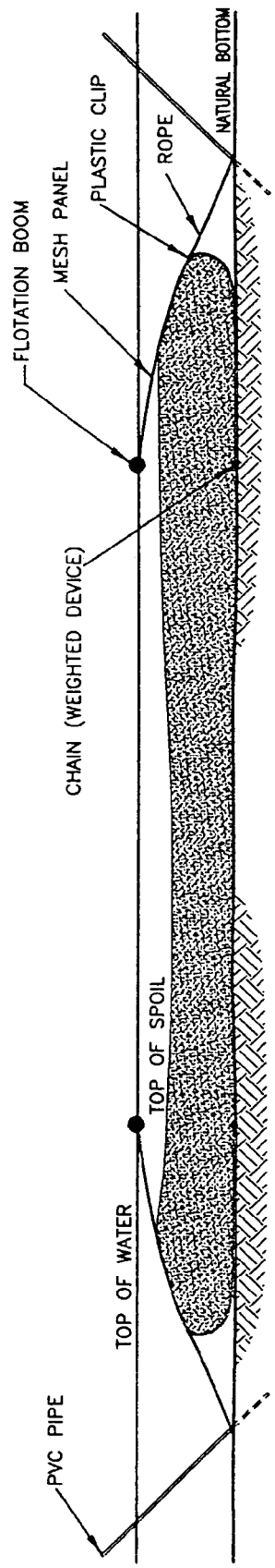
Figure 19:
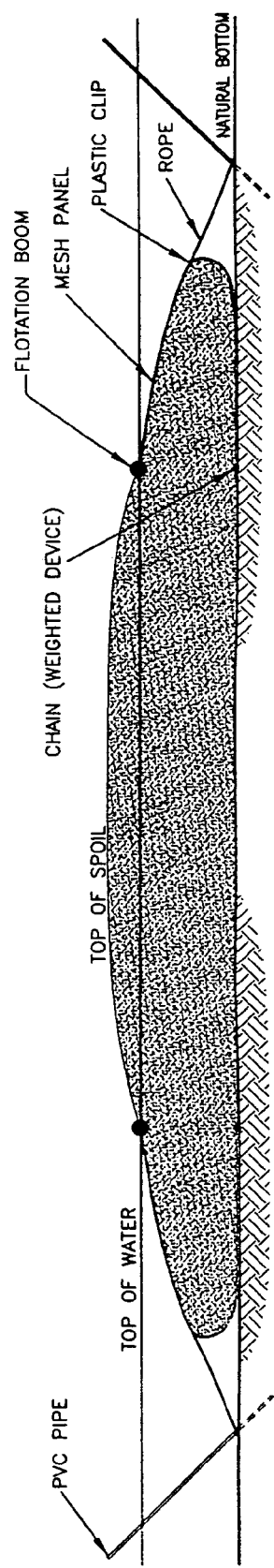
Figure 20:
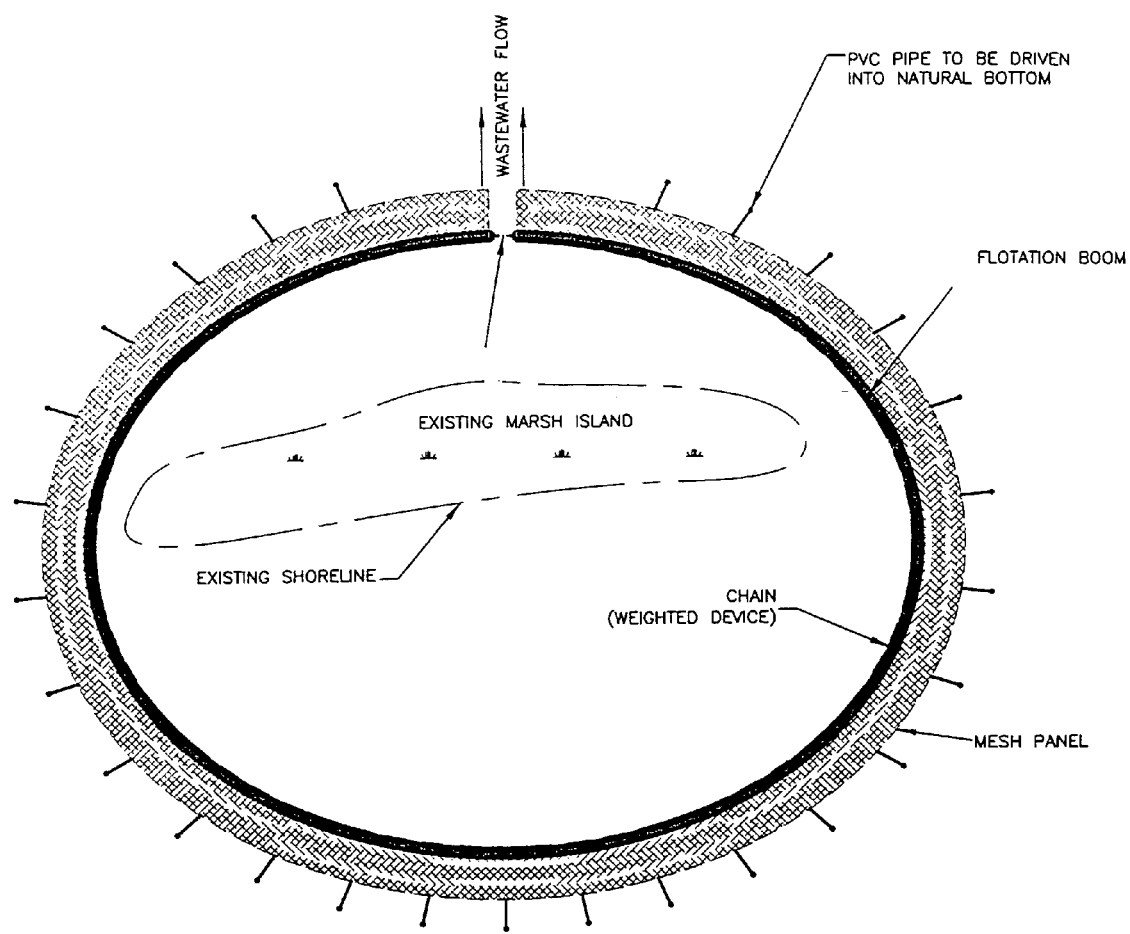
FIG. 20 is a top schematic diagram showing an alternative embodiment of a sediment-containment structure according to the invention.
Figure 21:
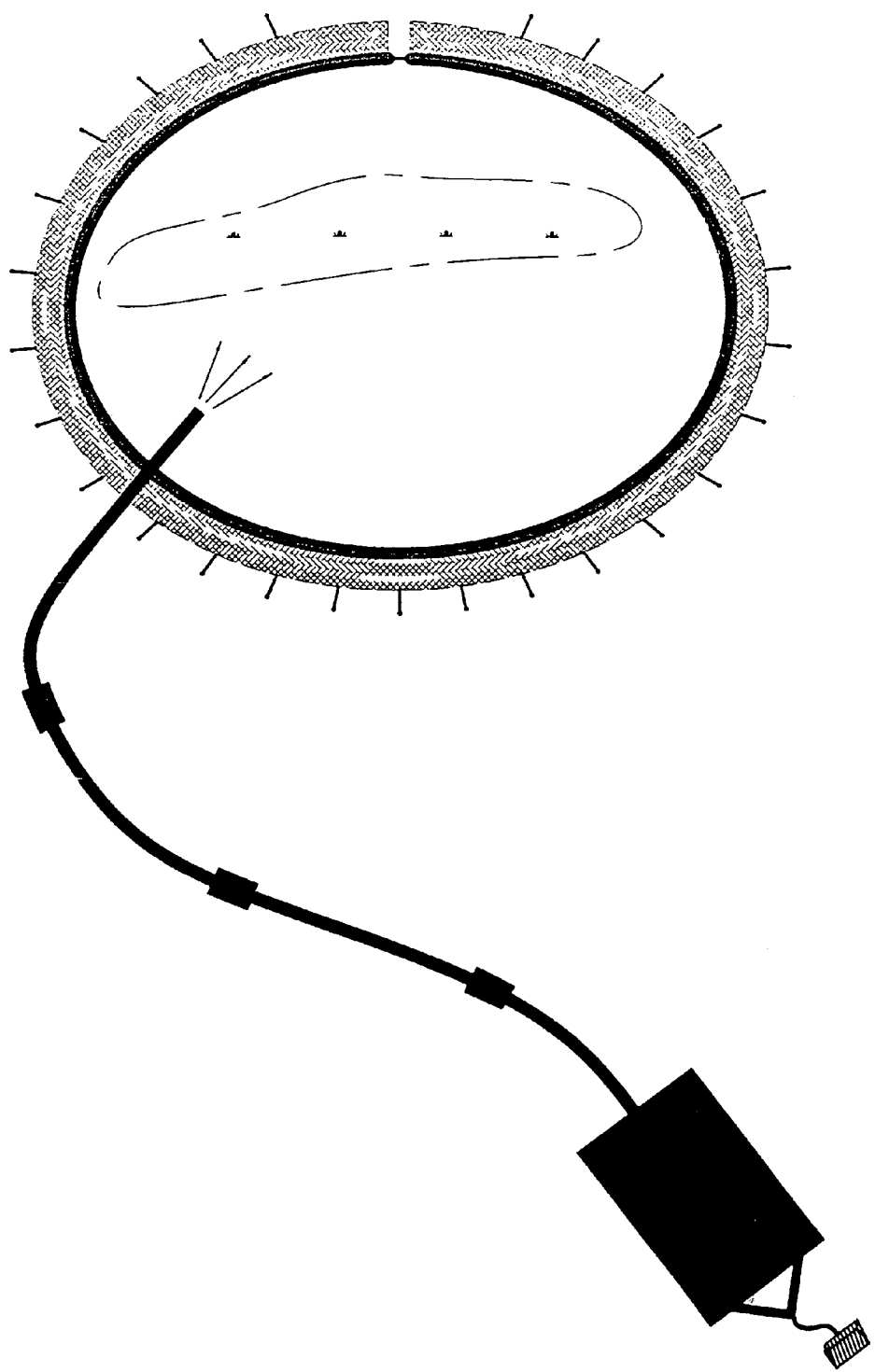
FIG. 21 is a top schematic diagram showing an alternative embodiment of a sediment-containment structure and a sediment source according to the invention.
Figure 22:
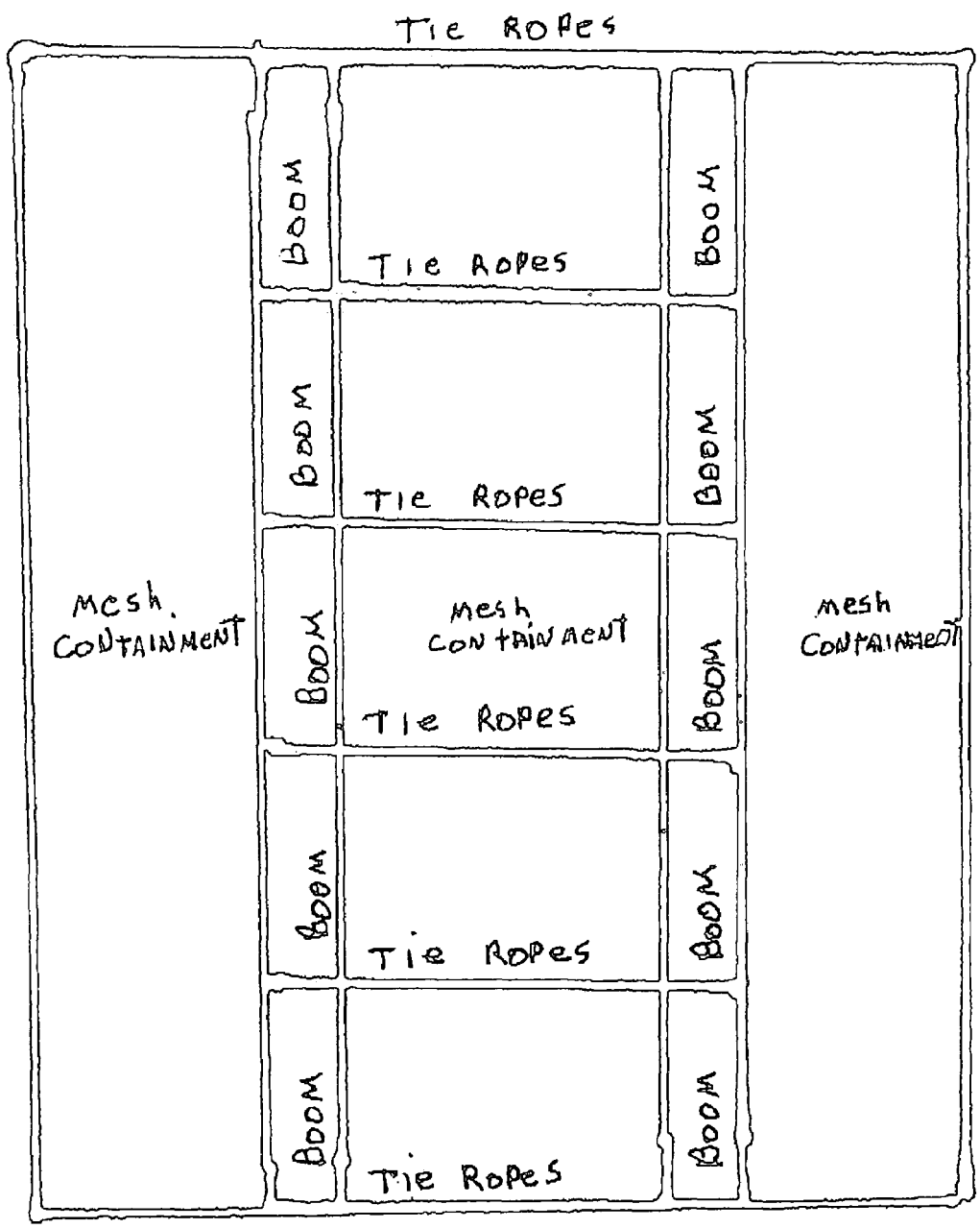
FIG. 22 is a top schematic diagram showing an alternative embodiment of a sediment-containment structure according to the invention.
Figure 23:
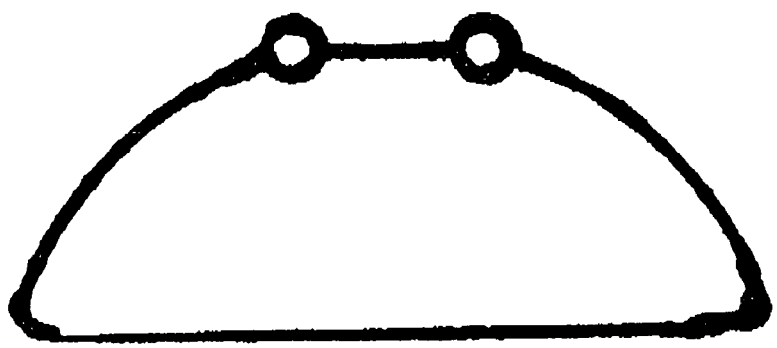
FIG. 23 is a schematic diagram showing an end view of an alternative embodiment of a sediment-containment structure according to the invention.
Figure 24:
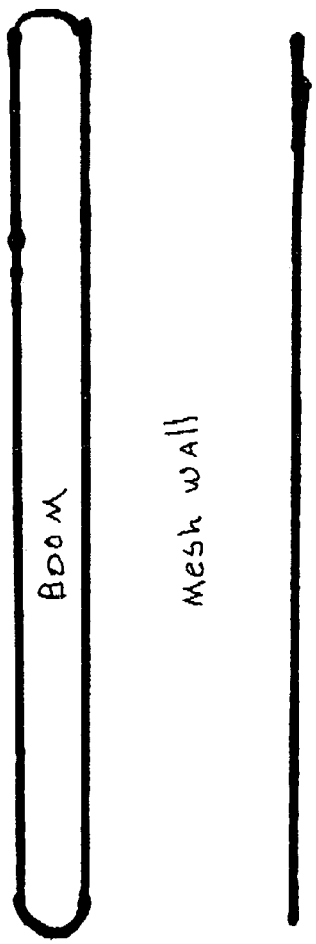
FIG. 24 is a side schematic diagram showing an alternative embodiment of a sediment-containment structure according to the invention.
Figure 25:
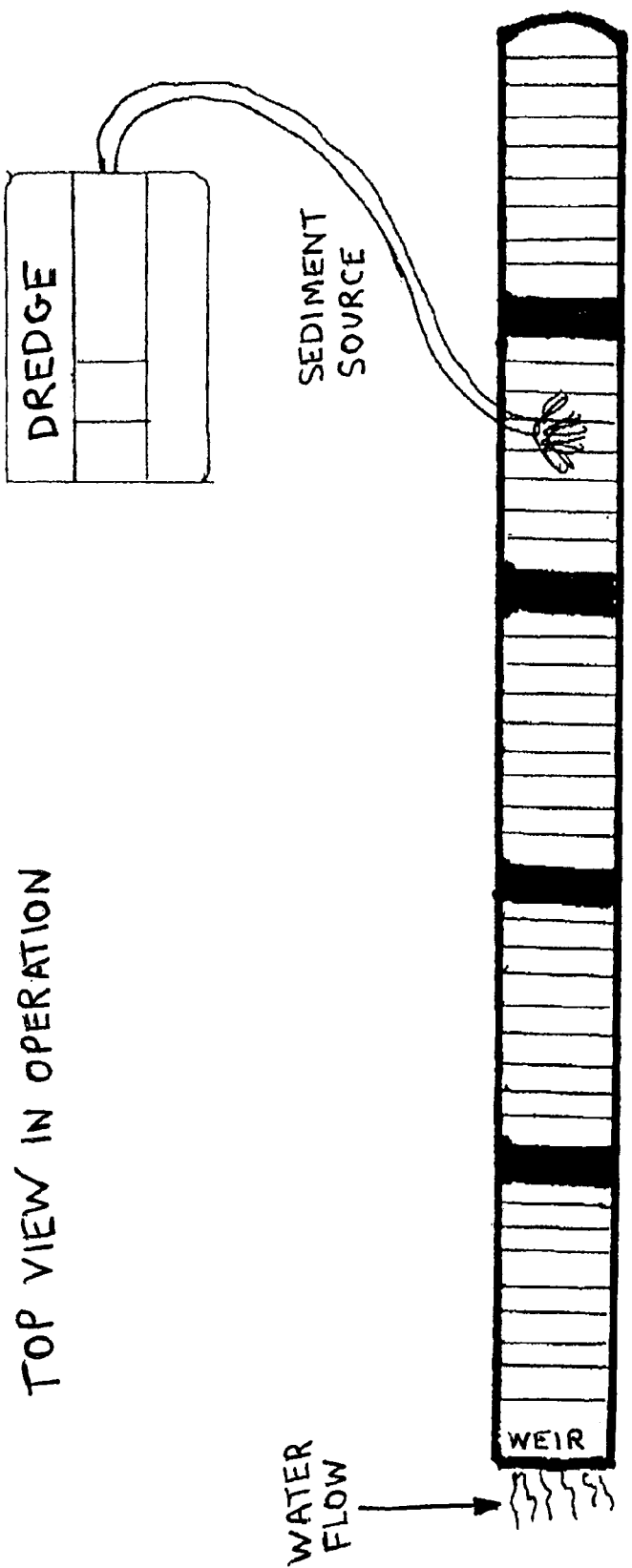
FIG. 25 is a schematic diagram showing an end view of an alternative embodiment of a sediment-containment structure according to the invention.
Figure 26:
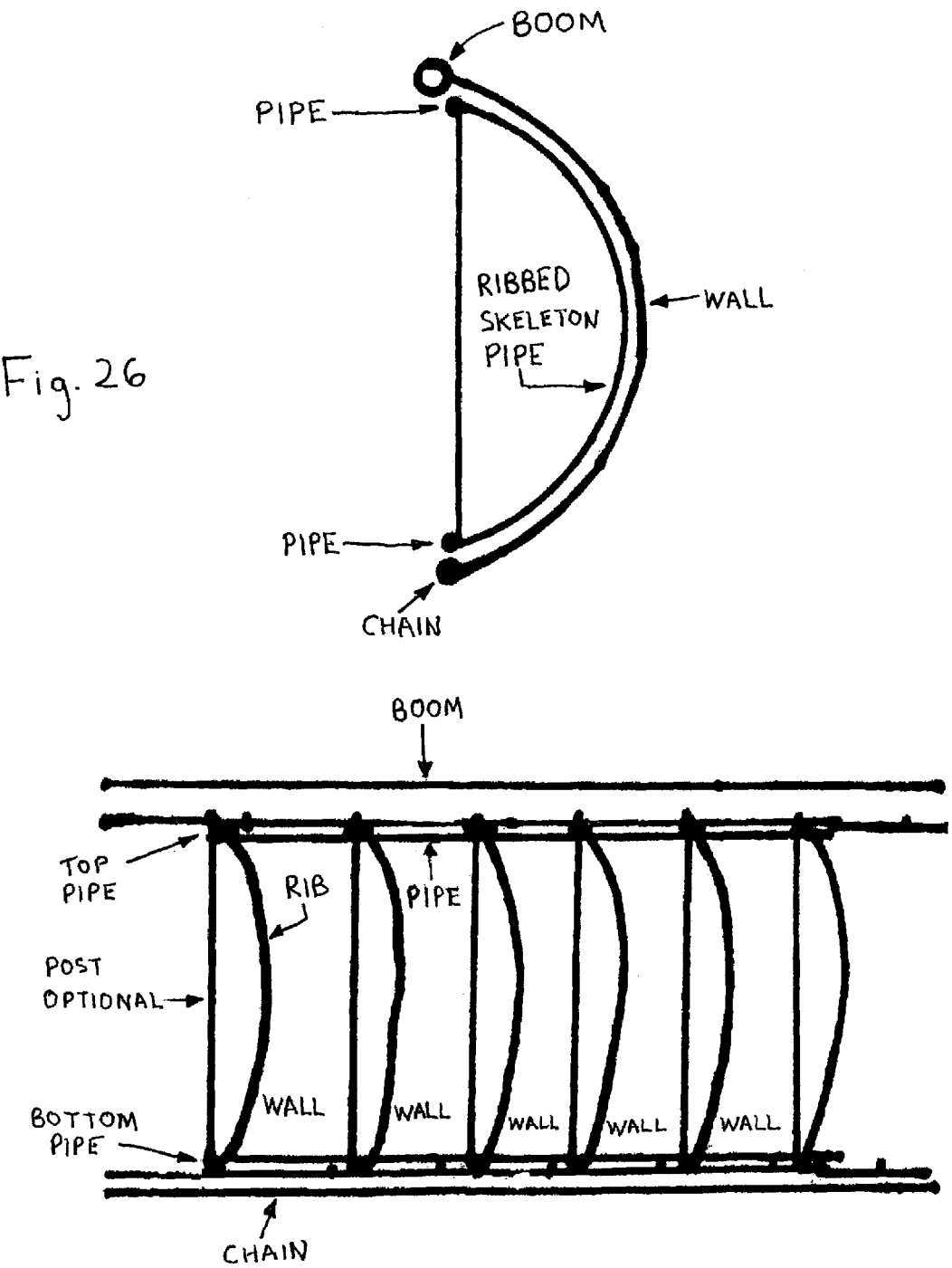
FIG. 26 is a schematic diagram showing an exploded partial end view and a side view of an alternative embodiment of a sediment-containment structure according to the invention.
Figure 27:
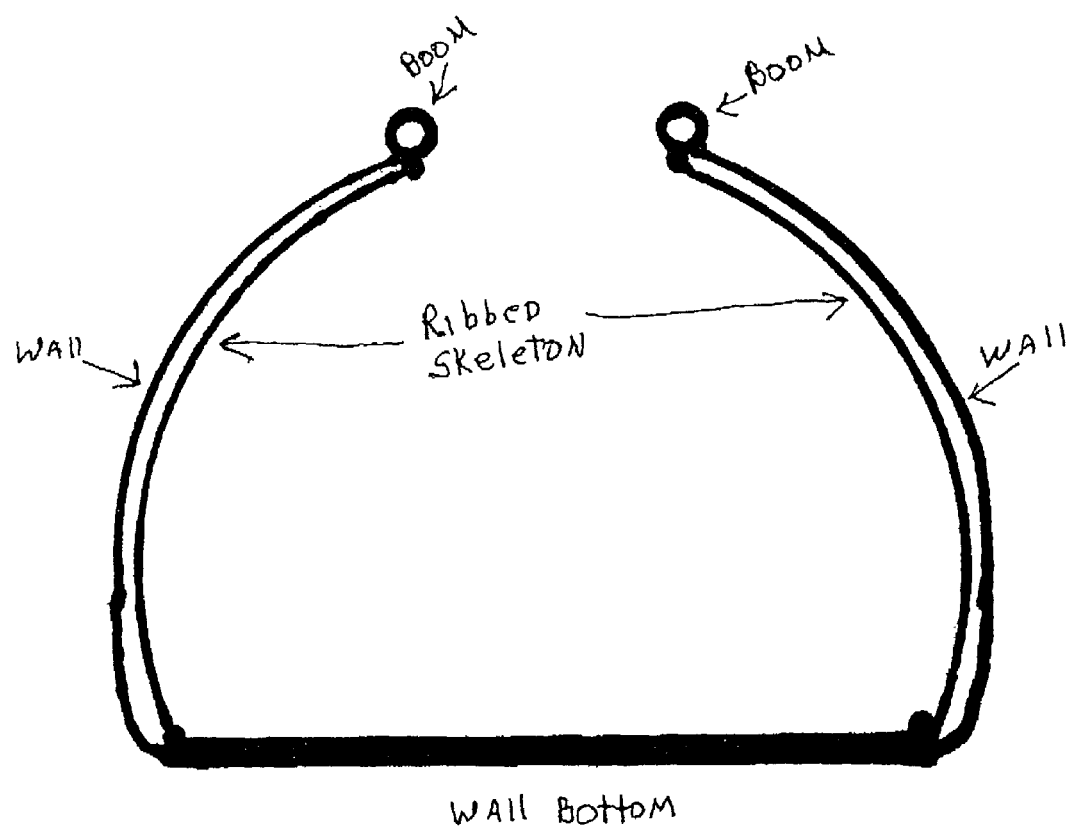
FIG. 27 is a schematic diagram showing a partial end view of an alternative embodiment of a sediment-containment structure according to the invention.
Figure 28:
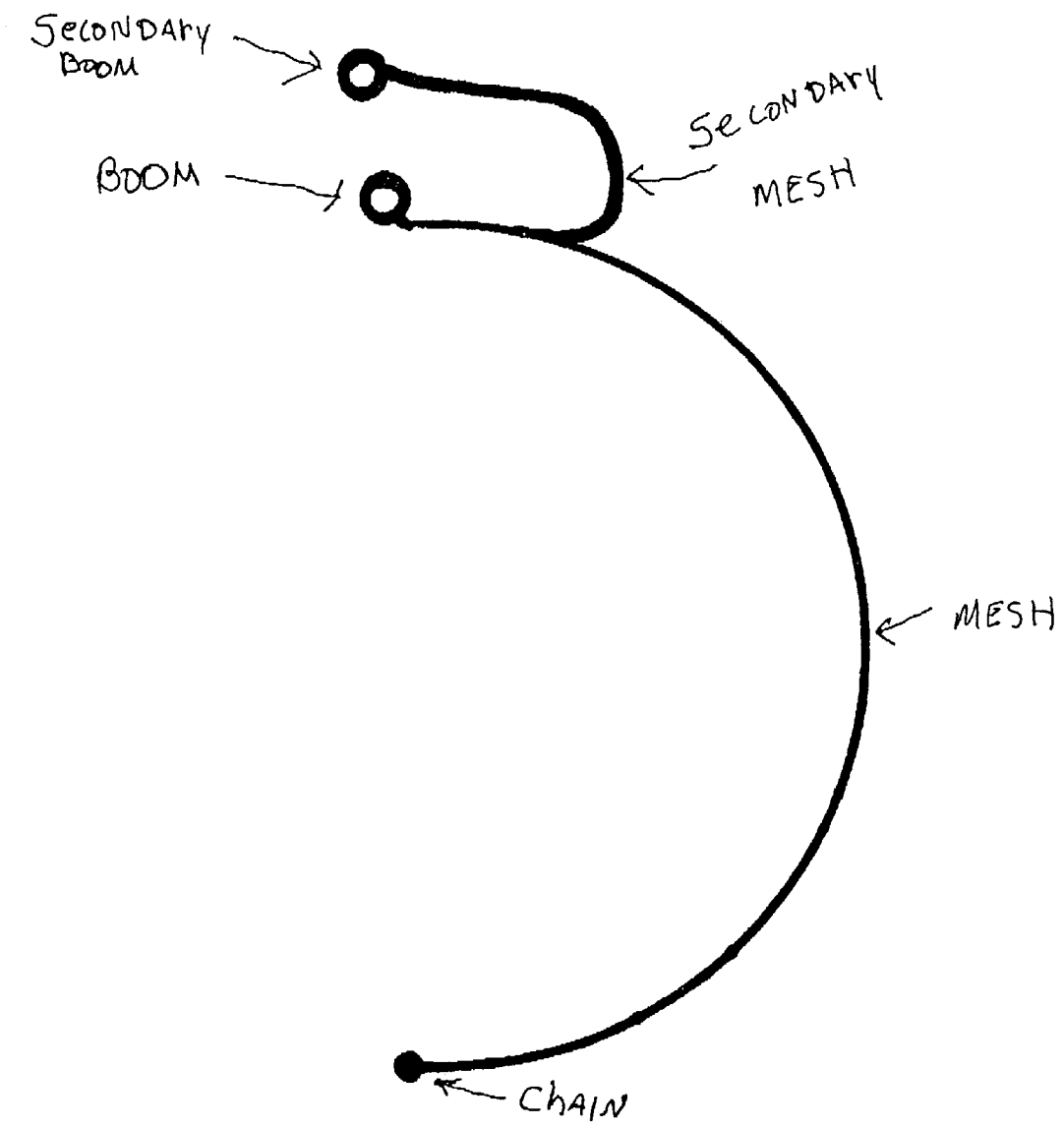
FIG. 28 is a sectional schematic diagram of an alternative embodiment of a sediment-containment structure according to the invention.
Figure 29:
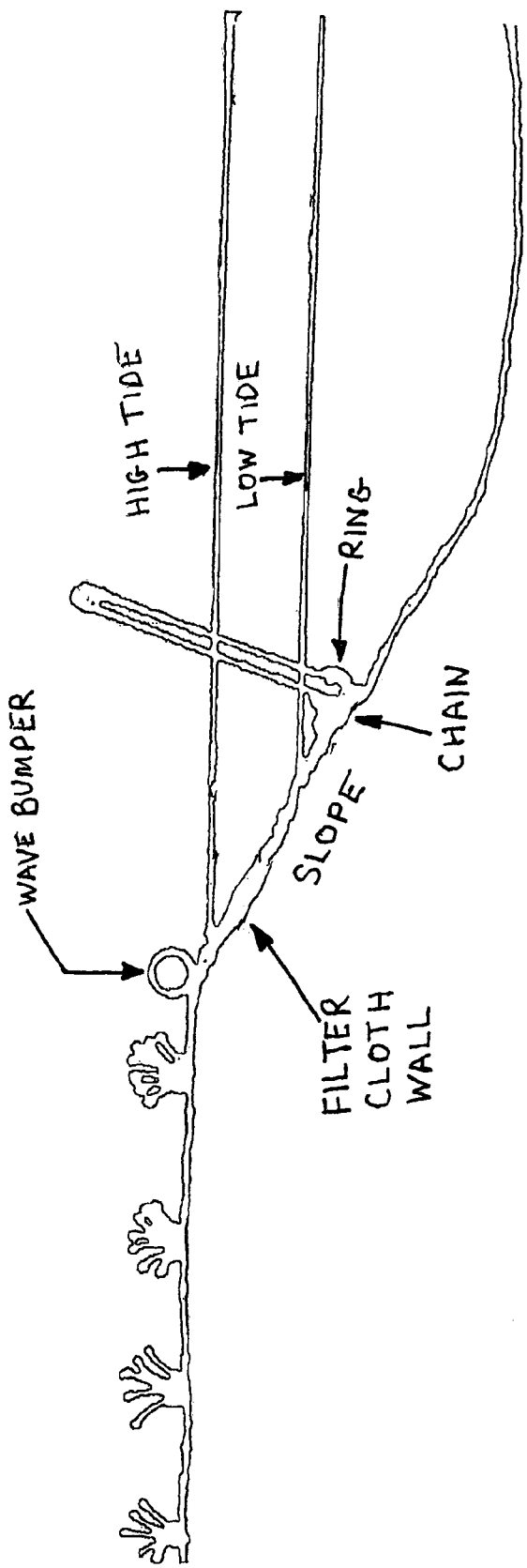
FIG. 29 is a side schematic view of an embodiment of an installation of a wave bumper according to the invention.
Figure 30:
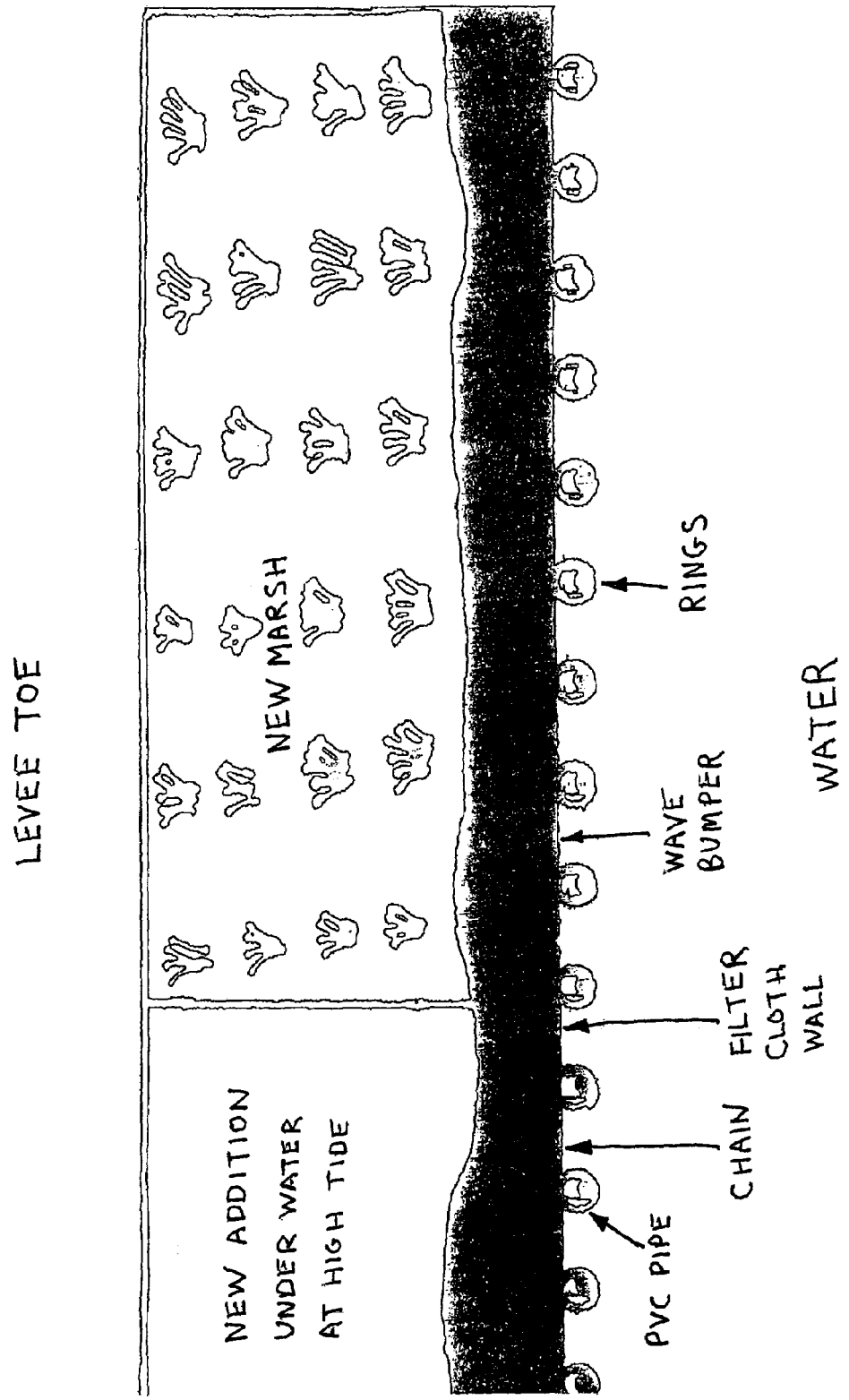
FIG. 30 is a top schematic view of an embodiment of an installation of a wave bumper according to the invention.
Figure 31:
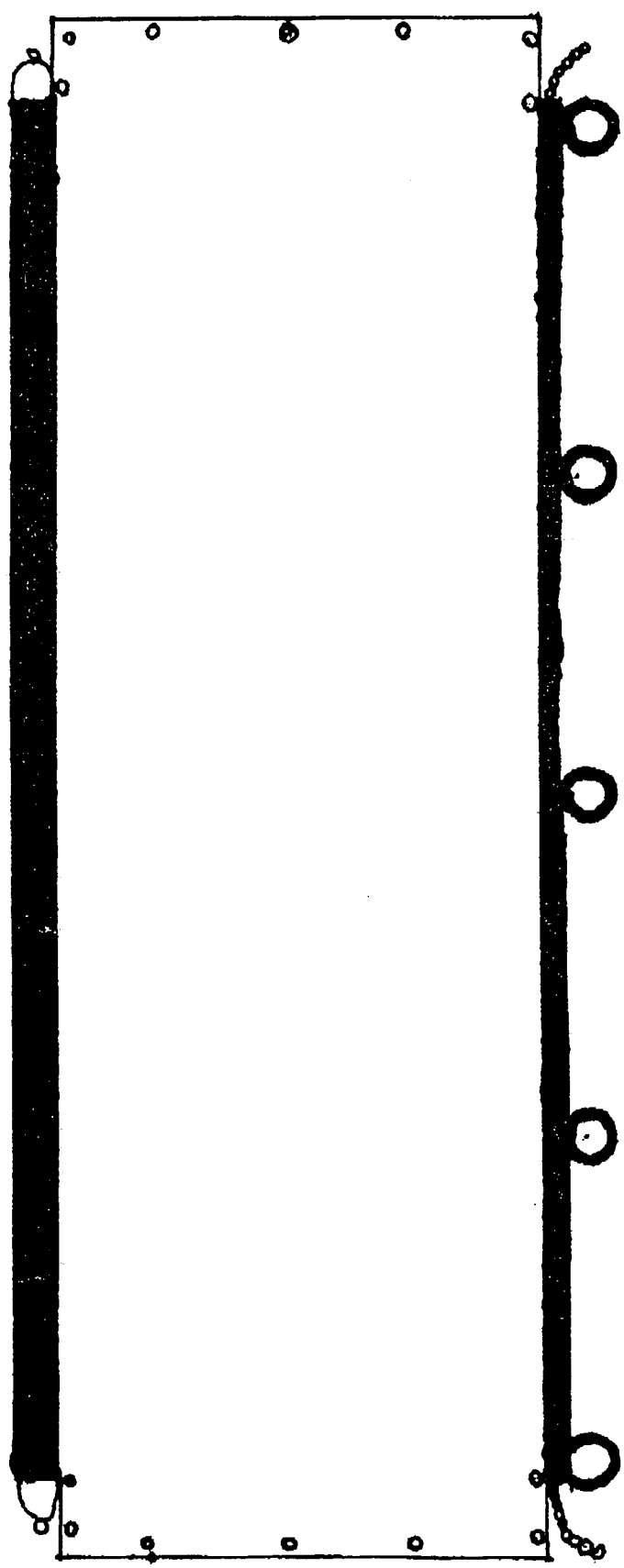
FIG. 31 is a side view of an embodiment of a segment of a wave bumper according to the invention.

Also mounted near the front end portion of deck 630 is control house 632. Control house 632 provides a convenient location for operating the amphibious dredging vehicle. Tank housing 638 includes therein tanks for both diesel fuel and hydraulic fluid. A powerplant in the form of diesel engine 636 provides power to the amphibious dredging vehicle 700 through three separate paths. The powerplant also may take the form of other fuel-air engines, electric motors, or other power-providing mechanisms. Diesel engine 636 powers pump 637A that pressurizes hydraulic fluid in a conventional hydraulic circuit 737, which includes conventional tubing linking the hydraulic pump 637A to all devices that are powered by the hydraulic circuit 737. FIG. 11 is a schematic diagram showing that the hydraulic circuit 737 links hydraulic pump 637A to first hydraulic drive motor 614, second hydraulic drive motor 624, hydraulic drive motor 653 mounted adjacent to dredge pump 650, hydraulic drive motor 691 mounted adjacent to water pump 690, hydraulic ram 663, and hydraulic ram 699; the devices are linked in conventional fashion by pairs of hydraulic lines.

In one path, the hydraulic circuit 737 powers the drive tracks, which allow the amphibious dredging vehicle to track forward across land or shallow water. The hydraulic circuit 737 powers a first track-driving means in the form of a first hydraulic drive motor 614 and second track-driving means in the form of second hydraulic drive motor 624. The first hydraulic drive motor 614 drives first drive track 612 through a chain and sprocket 616. The second hydraulic drive motor 624 likewise drives second hydraulic drive motor 624 drives second drive track 622 through a chain and sprocket 626. The claimed first track-driving means and the claimed second track-driving means do not have to be hydraulic drive motors. Instead, the claimed first track-driving means and the claimed second track-driving means may take the form of any device capable of providing sufficient motive power, including electric motors and mechanical transmissions driven either by a central powerplant or by individual powerplants for each track.

In the second path, the hydraulic circuit 737 provides power to a dredge-pump-driving means in the form of hydraulic drive motor 653 that drives dredge pump 650. When the dredge is being moved across deeper water from one dredging site to another, dredge pump 650 may be used to pump water through directable discharge 660 to move the amphibious dredging vehicle 700. By controlling the aim or orientation of directable discharge 660, the operator may control the direction of the amphibious dredging700 vehicle when the dredge pump 650 is being used to move the amphibious dredging vehicle 700 through water. The claimed dredge-pump-driving means does not have to be a hydraulic drive motor. Instead, the claimed dredge-pump-driving means may take the form of any device capable of providing sufficient motive power, including electric motors and mechanical transmissions driven either by a central powerplant or a powerplant dedicated to driving the dredge pump 650.

Figure 10:
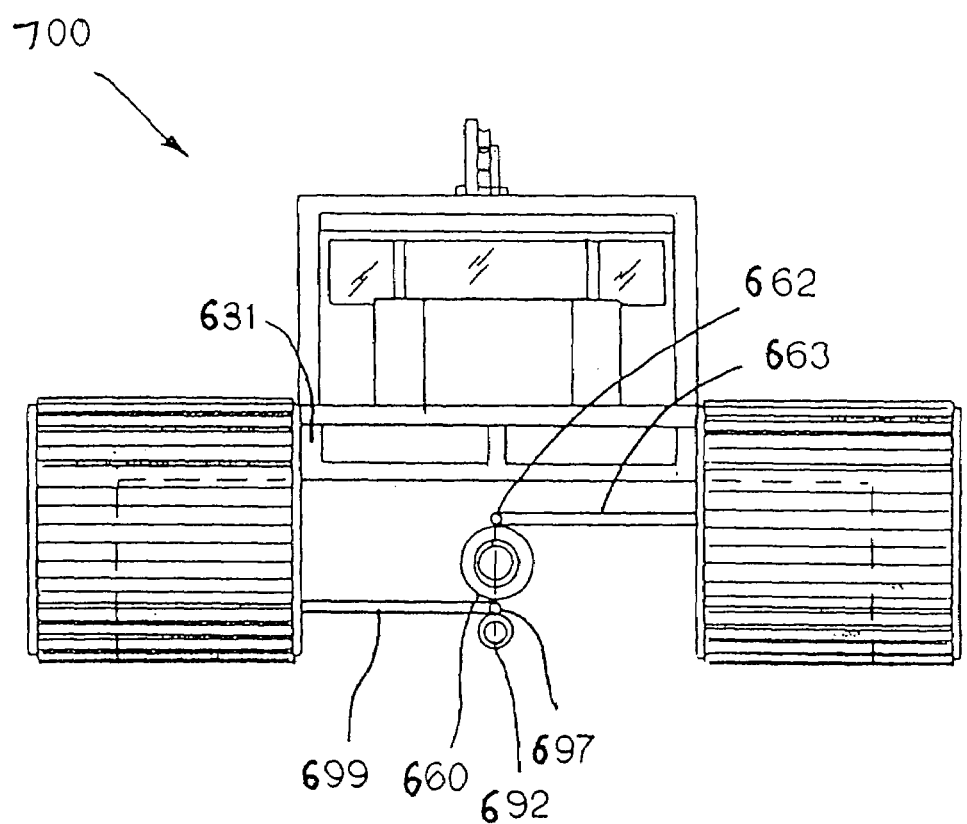
FIG. 10 is a partial rear view of an amphibious dredging vehicle according to the invention.

The rear end portion of the deck 630 is disposed opposite the front end portion of the deck 630. Mounted near the rear end portion of the deck 630 is directable discharge 660, which is more easily seen in FIG. 10. Directable discharge 660 is made from conventional sturdy, flexible tubing such as reinforced rubber or flexible PVC pipe and is joined to discharge plumbing 670 by flange 672 or by another conventional joint. Directable discharge 660 is operatively connected to cutterhead 640 and dredge pump 650 by conventional discharge plumbing 670, which preferably is aluminum pipe with a diameter between 4 inches and 10 inches. Directable discharge 660 is made from flexible material that allows the directable discharge 660 to be aimed as needed to provide the desired propulsion to the amphibious dredging vehicle 700. The directable-discharge-control means takes the form of ring 662 secured to directable discharge 660 and operatively connected to hydraulic ram 663, which is in turn attached to second floatable pontoon 620. The hydraulic ram 663 may be controlled to select and maintain the desired aim of the directable discharge 660. The directable-discharge-control means also may take the form of any of several known devices capable of aiming directable discharge 660—for example, hydraulic cylinders, cables, links, electric motors, solenoids, and other devices operatively connected to directable discharge 660 and capable of changing and maintaining the aim of the directable discharge 660 in the desired orientation.

In the third path, the hydraulic circuit 737 provides power to a water-pump-driving means in the form of a hydraulic drive motor 691 that drives water pump 690. Water pump 690 may be used to pump water from water intake 694 through water discharge 692 to move the amphibious dredging vehicle 700. By controlling the aim or orientation of water discharge 692, the operator may control the direction of the amphibious dredging700 vehicle when the water pump 690 is being used to move the amphibious dredging vehicle 700 through water. The claimed water-pump-driving means does not have to be a hydraulic drive motor. Instead, the claimed water-pump-driving means may take the form of any device capable of providing sufficient motive power, including electric motors and mechanical transmissions driven either by a central powerplant or a powerplant dedicated to driving the water pump 690.

The rear end portion of the deck 630 is disposed opposite the front end portion of the deck 630. Mounted near the rear end portion of the deck 630 is water discharge 692, which is more easily seen in FIG. 10. Water discharge 692 is operatively connected to water intake 694 and water pump 690 by conventional water-discharge plumbing 696, which preferably is aluminum pipe with a diameter between 4 inches and 10 inches. Water discharge 692 may be made from conventional sturdy, flexible tubing such as reinforced rubber or flexible PVC pipe and is joined to water-discharge plumbing 696 by flange 698 or by another conventional joint. Water discharge 692 is made from flexible tubular material that allows the water discharge 692 to be aimed as needed to provide the desired propulsion to the amphibious dredging vehicle 700. The water-discharge-control means is operatively connected to water discharge 692. The water-discharge-control means may take the form of ring 697 secured to water discharge 692 and operatively connected to hydraulic ram 699, which is operatively connected to ring 697 and attached to second floatable pontoon 620. Ring 697 and hydraulic ram 699 operate in the same manner as ring 662 and hydraulic ram 663 described above. Likewise the water-discharge-control means may take the same forms as the directable-discharge-control means described above. Note that in FIG. 8 water pump 690, water discharge 692, and water intake 694 are shown, but associated hardware such as ring 697, flange 698, and hydraulic ram 699 are omitted from FIG. 8 for clarity; these items appear in FIG. 9 and FIG. 10.

Figure 8:
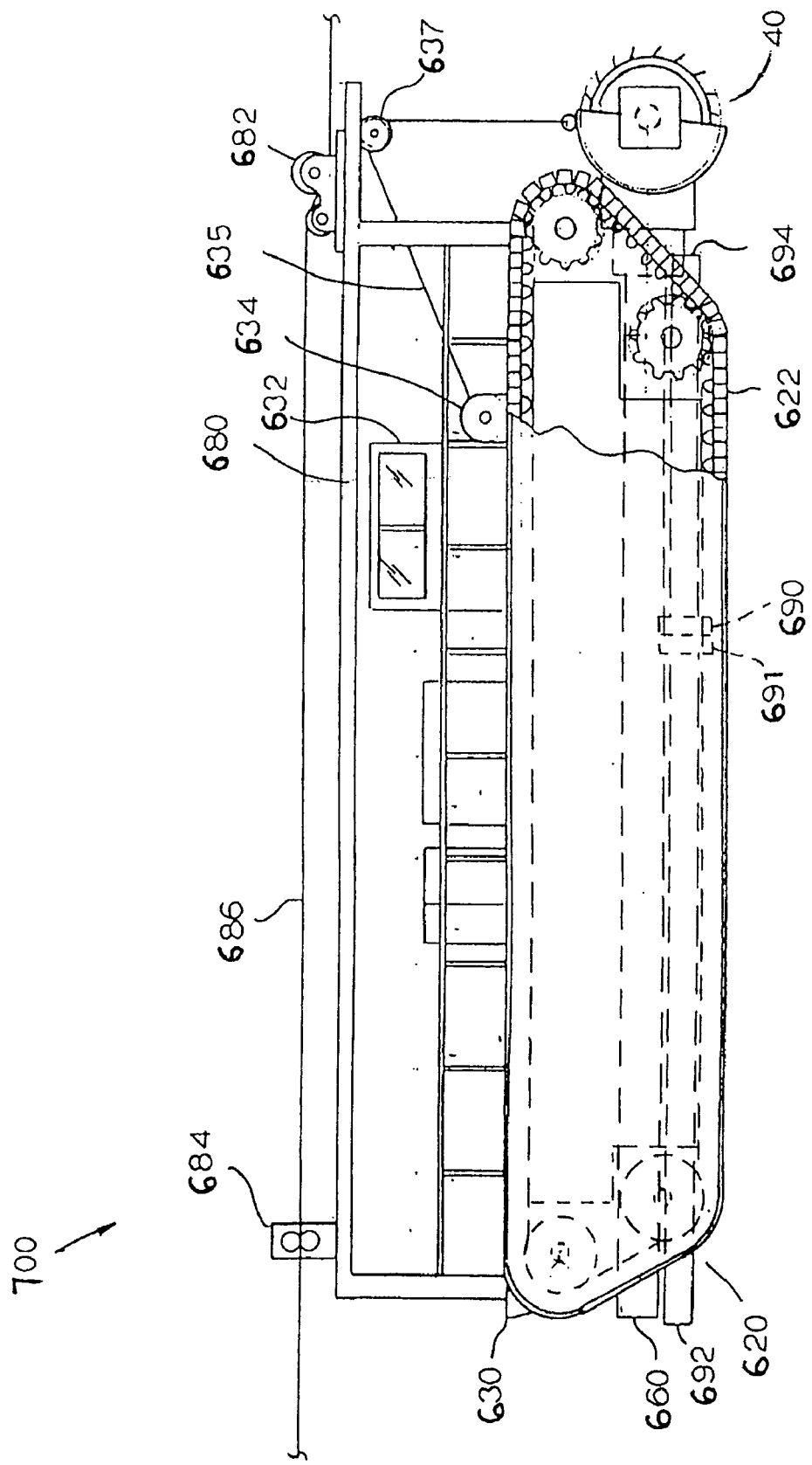
FIG. 8 is a partial side view of an amphibious dredging vehicle according to the invention.

FIG. 8 shows several optional components not previously discussed. Winch 634 is attached to deck 630. Cable 635 is wound onto winch 634. Cable 635 then passes through dredge pulley 637 and is attached to cutterhead 660. Winch 634 thus can raise and lower cutterhead 640 as desired. Overhead frame 680 provides a mounting point for dredge pulley 637. Overhead frame 680 also provides guide-wire pulleys 682 and 684, which attached to guide wire 686. Guide wires sometimes are used in dredging to provide a reference grid for dredging operations. Dredge pulley 637, overhead frame 680, guide-wire pulleys 682 and 684, and guide wire 686 are omitted from the other figures for clarity.

The invention claimed is:

1. An article of manufacture produced by a process comprising:
  (1) erecting a sediment-containment structure comprising
    (A) a plurality of boom segments connected end-to-end in an essentially closed shape, each boom segment comprising:
      (i) a floatable body having a first end portion, a second end portion, and a lower side portion;
      (ii) a first body-connecting means, being attached to the first end portion of the body, for connecting together adjacent boom segments;
      (iii) a second body-connecting means, being attached to the second end portion of the body, for connecting together adjacent boom segments;
      (iv) a sieve panel having an upper portion, a lower portion, and first and second side portions, the sieve panel being attached along its upper portion to the body with the first and second end portions of the sieve panel being respectively aligned with the first and second end portions of the body and the sieve panel having a first sieve-panel connecting means, disposed upon the first side portion, for connecting together adjacent sieve panels, and a second sieve-panel connecting means, disposed upon the second side portion, for connecting together adjacent sieve panels, the sieve panel having a height greater than or approximately equal to the depth of the water in the water-covered area and the sieve panel being made from water-permeable, fine-meshed material; wherein the first body-connecting means of each segment is connected to the second body-connecting means of an adjacent segment, and the first sieve-panel connecting means of each sieve panel is connected to the second sieve-panel connecting means of an adjacent sieve panel; and
    (B) a sediment source depositing sediment inside the area substantially enclosed by the essentially closed shape formed by the boom segments, and
  (2) introducing sediment into the substantially closed shape formed by the sediment-containment structure.

2. The article of manufacture as claimed in claim 1, wherein each boom segment further comprises an anchor segment attached to the lower portion of the sieve panel, the anchor segment having a first end portion aligned with the first end portion of the body and a second end portion aligned with the second end portion of the body, the anchor segment having first anchor-connecting means attached to the first end portion and second anchor-connecting means attached to second end portion, the first anchor-connecting means of each anchor segment being connected the second anchor-connecting means of an adjacent anchor segment.

3. The article of manufacture as claimed in claim 2, wherein each boom segment further comprises a tiedown having a first end portion and a second end portion, the first end portion being attached to the body and the second end portion being attached to the anchor segment of the floating boom segment.

4. The article of manufacture as claimed in claim 3, wherein the sediment source is the discharge of a dredge.

5. The article of manufacture as claimed in claim 2, wherein the water-permeable, fine-meshed material has an average mesh size of about 1/16 inches as measured across the greatest width of the mesh openings.

6. The article of manufacture as claimed in claim 2, wherein the sediment source is the discharge of an amphibious dredging vehicle comprising:
   (A) a floatable base having front and rear end portions and comprising:
      (i) a first floatable pontoon having a first drive track mounted thereon;
      (ii) a second floatable pontoon having a second drive track mounted thereon;
      (iii) a link disposed between the first floatable pontoon and the second floatable pontoon and holding the first pontoon and the second pontoon in essentially parallel relation;
   (B) a cutterhead dredge system attached to the base, the cutterhead dredge system comprising:
      (i) a cutterhead mounted to the front end portion of the base;
      (ii) a first directable discharge mounted to the rear end portion of the base;
      (iii) a dredge pump in operative connection with the cutterhead and the first directable discharge so as to develop suction at the cutterhead and to propel material from the cutterhead to the first directable discharge;
   (C) a first track-driving means disposed to transmit power to the first drive track;
   (D) a second track-driving means disposed to transmit power to the second drive track;
   (E) a dredge-pump-driving means disposed to transmit power to the dredge pump;
   (F) a first directable-discharge-control means for aiming the first directable discharge.

7. The article of manufacture as claimed in claim 1, wherein the sediment-containment structure further comprises an anchor line attached to the lower portion of the sieve panels of the boom segments, the anchor line running continuously along the perimeter of the essentially closed shape formed by the boom segments.

8. The article of manufacture as claimed in claim 7, wherein each boom segment further comprises a tiedown having a first end portion and a second end portion, the first end portion being attached to the body and the second end portion being attached to the anchor line.

9. The article of manufacture as claimed in claim 7, wherein the anchor line is a lead-core line.

10. The article of manufacture as claimed in claim 7, wherein the anchor line is a chain.

11. The article of manufacture as claimed in claim 7, wherein the sediment source is the discharge of a dredge.

12. The article of manufacture as claimed in claim 1, wherein the sediment source is the discharge of a dredge.

13. The article of manufacture as claimed in claim 12, wherein the height of a sieve panels is at least about twice the depth of the water in the water-covered area.

14. The article of manufacture as claimed in claim 13, wherein the length of the tiedowns under tension is approximately equal to the depth of the water in the water-covered area.

15. The article of manufacture as claimed in claim 14, wherein the first means for connecting sieve panel and the second means for connecting sieve panel of each boom segment are connectable portions of a zipper.

16. The article of manufacture as claimed in claim 15, wherein the sediment source is the discharge of a dredge.

17. The article of manufacture as claimed in claim 16, wherein the water-permeable, fine-meshed material has an average mesh size of about 1/16 inches as measured across the greatest width of the mesh openings.

18. The article of manufacture as claimed in claim 12, wherein the water-permeable, fine-meshed material has an average mesh size of about 1/16 inches as measured across the greatest width of the mesh openings.

19. The article of manufacture as claimed in claim 1, wherein the water-permeable, fine-meshed material has an average mesh size of about 1/16 inches as measured across the greatest width of the mesh openings.

20. The article of manufacture as claimed in claim 1, wherein the sediment source is the discharge of an amphibious dredging vehicle comprising:
   (A) a floatable base having front and rear end portions and comprising:
      (i) a first floatable pontoon having a first drive track mounted thereon;
      (ii) a second floatable pontoon having a second drive track mounted thereon;
      (iii) a link disposed between the first floatable pontoon and the second floatable pontoon and holding the first pontoon and the second pontoon in essentially parallel relation;
   (B) a cutterhead dredge system attached to the base, the cutterhead dredge system comprising:
      (i) a cutterhead mounted to the front end portion of the base;
      (ii) a first directable discharge mounted to the rear end portion of the base;
      (iii) a dredge pump in operative connection with the cutterhead and the first directable discharge so as to develop suction at the cutterhead and to propel material from the cutterhead to the first directable discharge;
   (C) a first track-driving means disposed to transmit power to the first drive track;
   (D) a second track-driving means disposed to transmit power to the second drive track;
   (E) a dredge-pump-driving means disposed to transmit power to the dredge pump;
   (F) a first directable-discharge-control means for aiming the first directable discharge.

21. A system for building up sediment in a water-covered area, comprising:

(A) a plurality of boom segments connected end-to-end in an essentially closed shape, each boom segment comprising:
   (i) a floatable body having a first end portion, a second end portion, and a lower side portion;
   (ii) a first body-connecting means attached to the first end portion of the body;
   (iii) a second body-connecting means attached to the second end portion of the body;
   (iv) a sieve panel having an upper portion, a lower portion, and first and second side portions, the sieve panel being attached along its upper portion to the body with the first and second end portions of the sieve panel being respectively aligned with the first and second end portions of the body and the sieve panel having a first sieve-panel connecting means disposed upon the first side portion and a second sieve-panel connecting means disposed upon the second side portion, the sieve panel having a height greater than or approximately equal to the depth of the water in the water-covered area and the sieve being made from water-permeable, fine-meshed material;
   wherein the first body-connecting means of each segment is connected to the second body-connecting means of an adjacent segment, and the first sieve-panel means for connecting each sieve panel is connected to the second sieve-panel connecting means of an adjacent sieve panel;
(B) a sediment source depositing sediment inside the area substantially enclosed by the essentially closed shape formed by the boom segments; and
(C) a wasteweir segment disposed so as to close the substantially closed shape formed by the floating boom segments, the wasteweir segment comprising:
   (i) a first post and a second post, each having an upper end and a lower end, and each being of sufficient length for the lower end to be driven into the water bottom of the water-covered area, with the upper end of each protruding for the water, and each having near its upper end a first wasteweir-body connecting means and having disposed thereon a first wasteweir-sieve connecting means and a barrier receiving means; said posts being connected to opposite ends of the essentially closed shape formed by the boom segments and being fixed in the ground in spaced relationship to one another;
   (ii) a barrier element adapted to be engaged by the barrier receiving means of both posts.

22. A system according to claim 21, wherein the sediment source is the discharge of an amphibious dredging vehicle comprising:
(A) a floatable base having front and rear end portions and comprising:
   (i) a first floatable pontoon having a first drive track mounted thereon;
   (ii) a second floatable pontoon having a second drive track mounted thereon;
   (iii) a link disposed between the first floatable pontoon and the second floatable pontoon and holding the first pontoon and the second pontoon in essentially parallel relation;
(B) a cutterhead dredge system attached to the base, the cutterhead dredge system comprising:
   (i) a cutterhead mounted to the front end portion of the base;
   (ii) a first directable discharge mounted to the rear end portion of the base;
   (iii) a dredge pump in operative connection with the cutterhead and the first directable discharge so as to develop suction at the cutterhead and to propel material from the cutterhead to the first directable discharge;
(C) a first track-driving means disposed to transmit power to the first drive track;
(D) a second track-driving means disposed to transmit power to the second drive track;
(E) a dredge-pump-driving means disposed to transmit power to the dredge pump;
(F) a first directable-discharge-control means for aiming the first directable discharge.

23. A method for building up land in a water-covered or water-surrounded area, comprising:
(1) erecting a sediment-containment structure comprising
   (A) a plurality of boom segments connected end-to-end in an essentially closed shape, each boom segment comprising:
     (i) floatable body having a first end portion, a second end portion, and a lower side portion;
     (ii) a first body-connecting means attached to the first end portion of the body;
     (iii) a second body-connecting means attached to the second end portion of the body;
     (iv) a sieve panel having an upper portion, a lower portion, and first and second side portions, the sieve panel being attached along its upper portion to the body with the first and second end portions of the sieve panel being respectively aligned with the first and second end portions of the body and the sieve panel having a first sieve-panel connecting means disposed upon the first side portion and a second sieve-panel connecting means disposed upon the second side portion, the sieve panel having a height greater than or approximately equal to the depth of the water in the water-covered area and the sieve being made from water-permeable, fine-meshed material; wherein the first body-connecting means of each segment is connected to the second body-connecting means of an adjacent segment, and the first sieve-panel means for connecting each sieve panel is connected to the second sieve-panel connecting means of an adjacent sieve panel;
   (B) a sediment source depositing sediment inside the area substantially enclosed by the essentially closed shape formed by the boom segments; and
   (C) a wasteweir segment disposed so as to close the substantially closed shape formed by the floating boom segments, the wasteweir segment comprising:
     (i) a first post and a second post, each having an upper end and a lower end, and each being of sufficient length for the lower end to be driven into the water bottom of the water-covered area, with the upper end of each protruding for the water, and each having near its upper end a first wasteweir-body connecting means and having disposed thereon a first wasteweir-sieve connecting means and a barrier receiving means; said posts being connected to opposite ends of the essentially closed shape formed by the boom segments and being fixed in the ground in spaced relationship to one another;
     (ii) a barrier element adapted to be engaged by the barrier receiving means of both posts; and
(2) introducing sediment into the substantially closed shape formed by the sediment-containment structure.

24. A method according to claim 23, wherein the sediment source is the discharge of an amphibious dredging vehicle comprising:
- (A) a floatable base having front and rear end portions and comprising:
  - (i) a first floatable pontoon having a first drive track mounted thereon;
  - (ii) a second floatable pontoon having a second drive track mounted thereon;
  - (iii) a link disposed between the first floatable pontoon and the second floatable pontoon and holding the first pontoon and the second pontoon in essentially parallel relation;
- (B) a cutterhead dredge system attached to the base, the cutterhead dredge system comprising:
  - (i) a cutterhead mounted to the front end portion of the base;
  - (ii) a first directable discharge mounted to the rear end portion of the base;
  - (iii) a dredge pump in operative connection with the cutterhead and the first directable discharge so as to develop suction at the cutterhead and to propel material from the cutterhead to the first directable discharge;
- (C) a first track-driving means disposed to transmit power to the first drive track;
- (D) a second track-driving means disposed to transmit power to the second drive track;
- (E) a dredge-pump-driving means disposed to transmit power to the dredge pump;
- (F) a first directable-discharge-control means for aiming the first directable discharge.

* * * * *